(12) United States Patent
Shirane et al.

(10) Patent No.: US 11,979,223 B2
(45) Date of Patent: May 7, 2024

(54) INFORMATION PROCESSING DEVICE, INFORMATION PROCESSING METHOD, INFORMATION PROCESSING PROGRAM, TERMINAL DEVICE, AND METHOD AND PROGRAM FOR CONTROLLING TERMINAL DEVICE

(71) Applicant: Sony Group Corporation, Tokyo (JP)

(72) Inventors: Keita Shirane, Tokyo (JP); Yuya Kihara, Tokyo (JP); Ichiro Sudo, Tokyo (JP)

(73) Assignee: Sony Group Corporation, Tokyo (JP)

( * ) Notice: Subject to any disclaimer, the term of this patent is extended or adjusted under 35 U.S.C. 154(b) by 8 days.

(21) Appl. No.: 17/773,764

(22) PCT Filed: Nov. 4, 2020

(86) PCT No.: PCT/JP2020/041178
§ 371 (c)(1),
(2) Date: May 2, 2022

(87) PCT Pub. No.: WO2021/095598
PCT Pub. Date: May 20, 2021

(65) Prior Publication Data
US 2022/0385385 A1 Dec. 1, 2022

(30) Foreign Application Priority Data
Nov. 12, 2019 (JP) .................... 2019-204789

(51) Int. Cl.
*H04H 20/14* (2008.01)
*H04H 60/05* (2008.01)

(52) U.S. Cl.
CPC ............ *H04H 20/14* (2013.01); *H04H 60/05* (2013.01)

(58) Field of Classification Search
CPC ........ H04H 20/14; H04H 60/05; H04N 5/268; H04N 5/28; H04N 21/2187; H04N 21/234;
(Continued)

(56) References Cited

U.S. PATENT DOCUMENTS 5,043,829 A * 8/1991 Hahn ..................... G11B 27/28
6,825,858 B2 * 11/2004 Sato ....................... H04N 21/47
348/E5.103

(Continued)

FOREIGN PATENT DOCUMENTS

CN 109309843 A 2/2019
GB 2397462 A 7/2004
(Continued)

OTHER PUBLICATIONS

International Search Report dated Jan. 26, 2021 in PCT/JP2020/041178 filed on Nov. 4, 2020 (2 pages).

*Primary Examiner* — Michael B. Pierorazio
(74) *Attorney, Agent, or Firm* — Oblon, McClelland, Maier & Neustadt, L.L.P.

(57) ABSTRACT

An information processing device includes a control unit that determines whether or not a terminal device and an imaging device are associated with each other on the basis of first identification information received from the terminal device and second identification information received from the imaging device, and sets the terminal device as a destination of transmission of a return video image on the basis of a determination result.

14 Claims, 13 Drawing Sheets

(58) Field of Classification Search
CPC ......... H04N 21/2407; H04N 21/25825; H04N 21/25816; H04N 21/25808; H04N 21/266; H04N 21/6405
See application file for complete search history.

(56) References Cited

U.S. PATENT DOCUMENTS

| | | | |
|---|---|---|---|
| 7,567,592 B2* | 7/2009 | Kobayashi | G06F 3/14 370/538 |
| 8,248,530 B2* | 8/2012 | Sato | H04N 21/43632 348/554 |
| 8,255,579 B2* | 8/2012 | Kikkawa | G09G 5/003 710/36 |
| 8,544,055 B2* | 9/2013 | Kimoto | H04L 25/0272 725/151 |
| 2008/0080596 A1* | 4/2008 | Inoue | G06F 3/14 375/E7.076 |
| 2008/0152023 A1* | 6/2008 | Yoshida | G09G 5/006 348/553 |
| 2009/0027405 A1* | 1/2009 | Kaga | G09G 5/006 345/520 |
| 2009/0150961 A1* | 6/2009 | Kabuto | H04N 19/61 725/118 |
| 2009/0153737 A1* | 6/2009 | Glen | H04N 5/21 348/E5.062 |
| 2009/0157885 A1* | 6/2009 | Takatsuji | H04L 12/282 709/228 |
| 2009/0190040 A1* | 7/2009 | Watanabe | H04N 5/765 348/725 |
| 2009/0193490 A1* | 7/2009 | Stone | H04N 21/462 725/151 |
| 2009/0256963 A1* | 10/2009 | Sato | H04N 21/426 348/554 |
| 2009/0281643 A1* | 11/2009 | Higuchi | H04N 21/4345 348/554 |
| 2009/0282437 A1* | 11/2009 | Malec | G06F 3/1423 725/40 |
| 2009/0284536 A1* | 11/2009 | Yoshida | H04N 21/43635 345/520 |
| 2009/0316004 A1* | 12/2009 | Kitamori | H04N 21/4135 348/207.1 |
| 2011/0047586 A1* | 2/2011 | Koizumi | H04N 21/43635 725/118 |
| 2011/0067082 A1* | 3/2011 | Walker | H04H 60/05 725/114 |
| 2011/0154414 A1* | 6/2011 | Kimoto | H04N 5/775 725/78 |
| 2011/0181766 A1* | 7/2011 | Hashiguchi | H04N 23/54 348/333.12 |
| 2011/0206355 A1* | 8/2011 | Toba | H04N 5/44 704/E21.001 |
| 2013/0086622 A1* | 4/2013 | Narushima | H04N 21/43635 725/138 |
| 2013/0159565 A1* | 6/2013 | Soyannwo | G09G 5/006 710/33 |
| 2013/0232356 A1* | 9/2013 | Sato | H04N 21/443 713/320 |
| 2013/0283333 A1* | 10/2013 | Sato | H04N 21/43635 725/127 |
| 2016/0134932 A1* | 5/2016 | Karp | H04L 67/125 348/207.11 |

FOREIGN PATENT DOCUMENTS

| | | |
|---|---|---|
| JP | 2012-230410 A | 11/2012 |
| JP | 2014119983 A | 6/2014 |
| JP | 2015-84478 A | 4/2015 |

* cited by examiner

FIG. 6
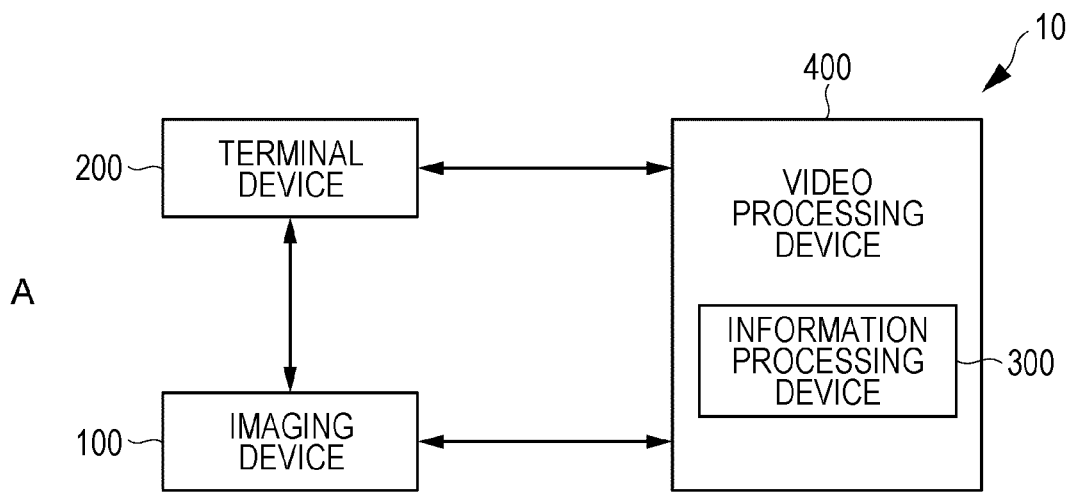
A
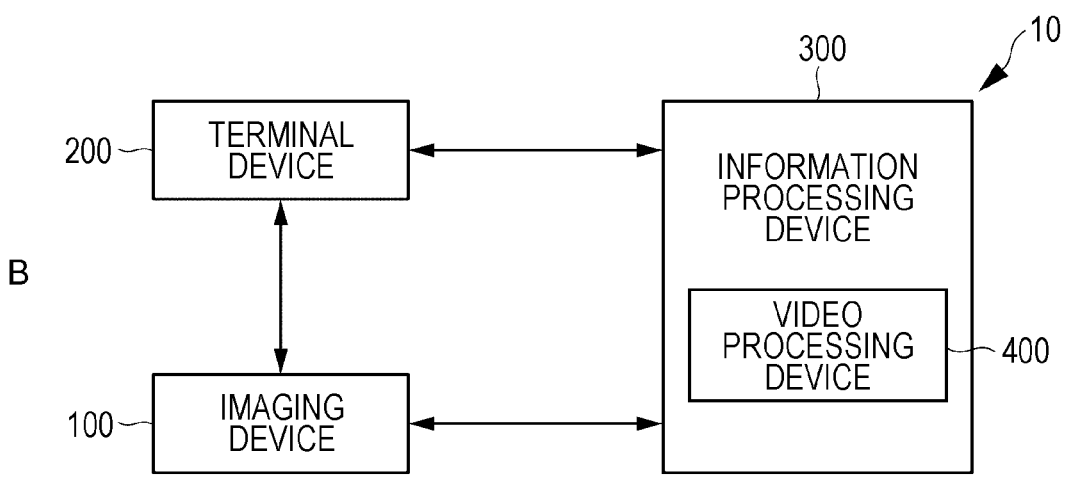
B

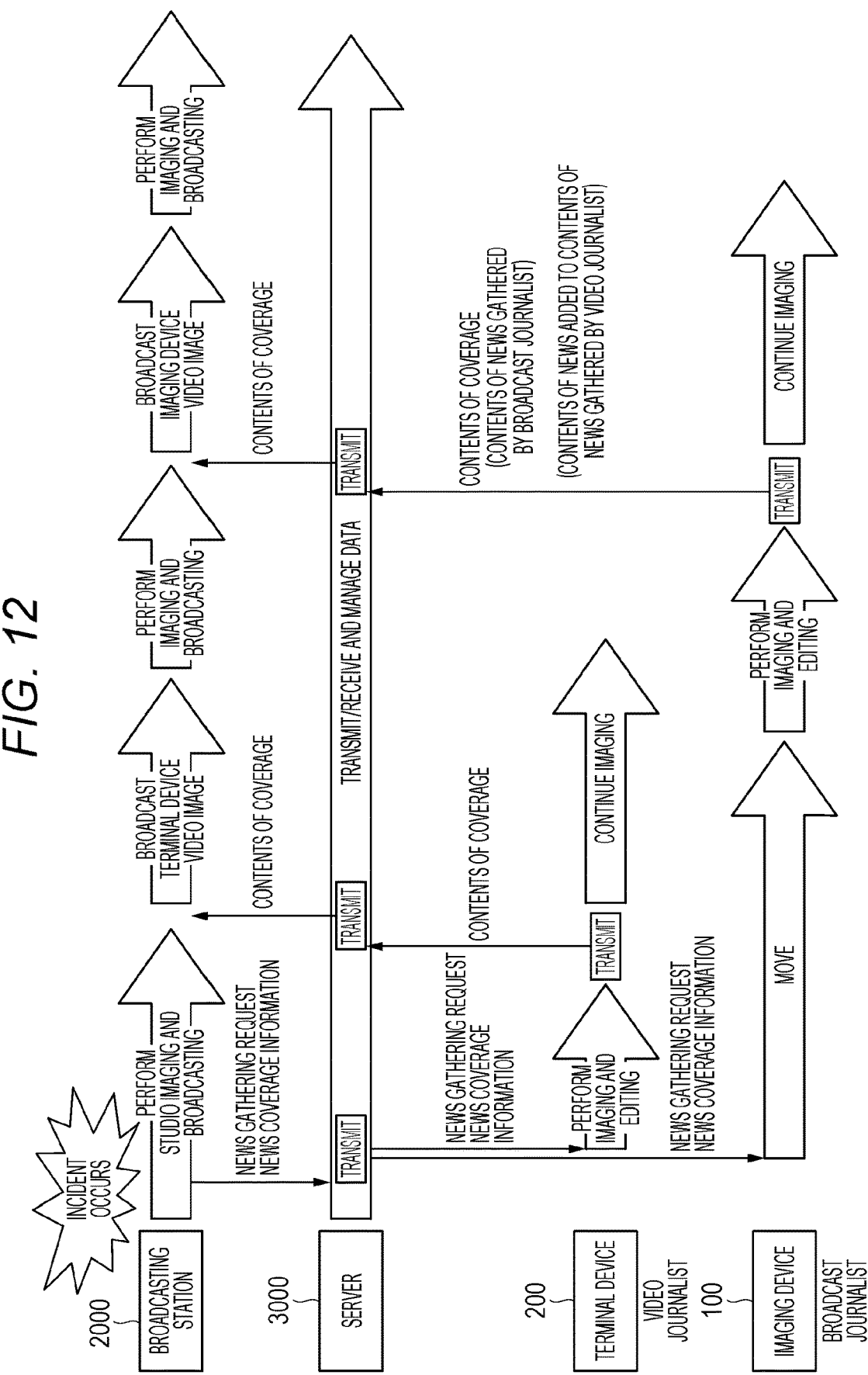

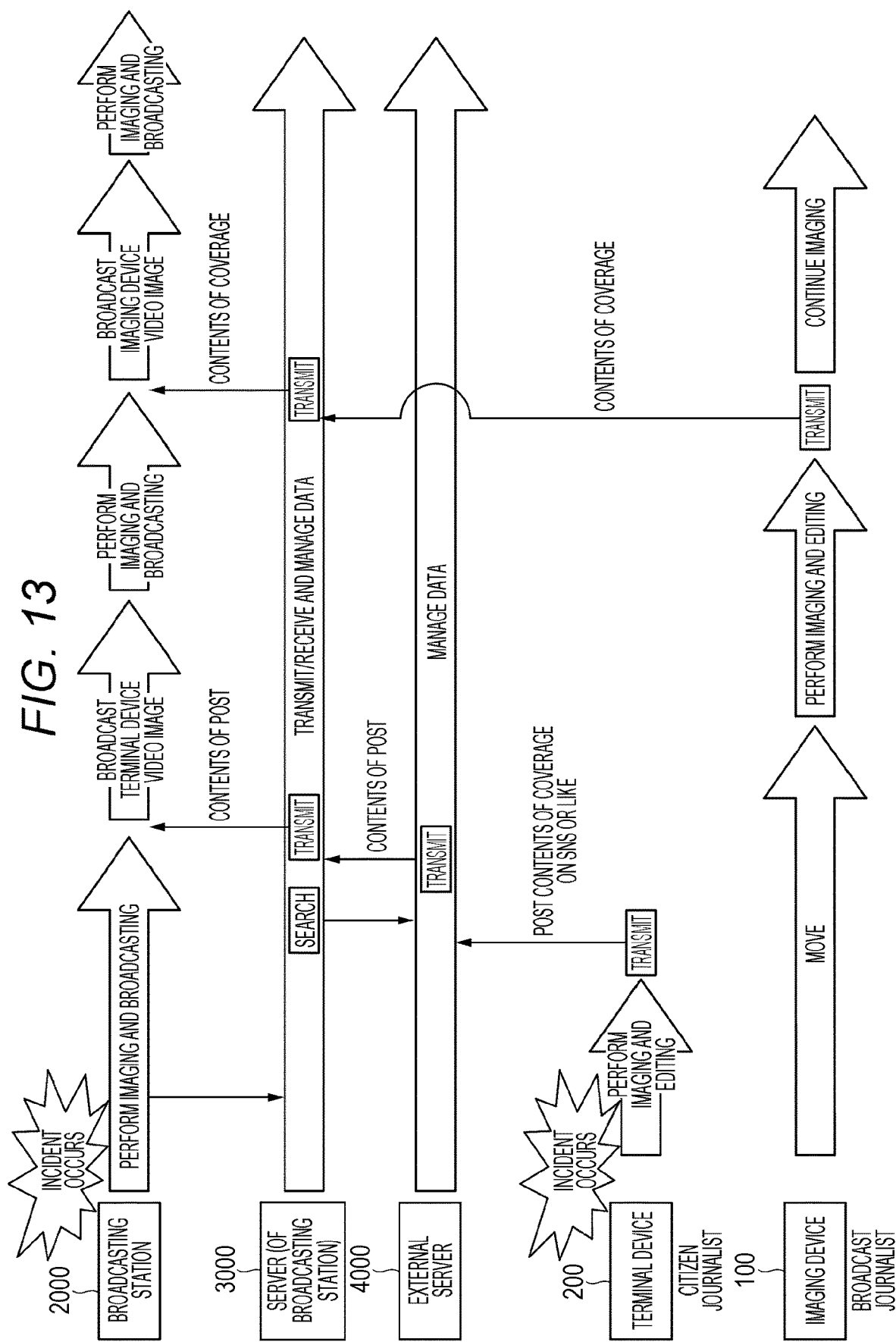

INFORMATION PROCESSING DEVICE, INFORMATION PROCESSING METHOD, INFORMATION PROCESSING PROGRAM, TERMINAL DEVICE, AND METHOD AND PROGRAM FOR CONTROLLING TERMINAL DEVICE

TECHNICAL FIELD

The present technology relates to an information processing device, an information processing method, an information processing program, a terminal device, a method and a program for controlling the terminal device.

BACKGROUND ART

Regarding imaging devices that capture images for live broadcast reporting and real-time streaming, there is a demand to check how the captured video images are currently being broadcast or distributed.

In view of this, Patent Document 1 discloses a technique for delivering the video image currently being broadcast as a return video image to a terminal owned by the news gatherer, for example (Patent Document 1).

CITATION LIST

Patent Document

Patent Document 1: Japanese Patent Application Laid-Open No. 2015-84478

SUMMARY OF THE INVENTION

Problems to be Solved by the Invention

However, there is a possibility that a return video image will be delivered to a terminal that is not associated with any imaging device being used by the news gatherer.

The present technology has been made in view of such aspects, and aims to provide an information processing device that enables delivery of a return video image to a terminal associated with an imaging device, an information processing method, an information processing program, a terminal device, and a method and a program for controlling a terminal device.

Solutions to Problems

To solve the above problem, a first technique is an information processing device that includes a control unit that determines whether or not a terminal device and an imaging device are associated with each other on the basis of first identification information received from the terminal device and second identification information received from the imaging device, and sets the terminal device as the destination of transmission of a return video image on the basis of a determination result.

Further, a second technique is an information processing method that includes: determining whether or not a terminal device and an imaging device are associated with each other on the basis of first identification information received from the terminal device and second identification information received from the imaging device; and transmitting a return video image to the terminal device on the basis of a determination result.

Further, a third technique is an information processing program for: determining whether or not a terminal device and an imaging device are associated with each other on the basis of first identification information received from the terminal device and second identification information received from the imaging device; and transmitting a return video image to the terminal device on the basis of a determination result.

Further, a fourth technique is a terminal device that transmits first identification information in which imaging device identification information that is received from an external imaging device and is for identifying the external imaging device, and terminal device identification information for identifying the terminal device are associated with each other. The terminal device includes a control unit that performs control to receive a return video image transmitted by an external information processing device on the basis of a result of determination made as to whether or not the terminal device and the imaging device are associated with each other on the basis of the first identification information and second identification information received from the external imaging device.

Further, a fifth technique is a terminal device control method that includes: transmitting first identification information in which imaging device identification information that is received from an external imaging device and is for identifying the external imaging device, and terminal device identification information for identifying the terminal device are associated with each other; and performing control to receive a return video image transmitted by an external information processing device on the basis of a result of determination made as to whether or not the terminal device and the imaging device are associated with each other on the basis of the first identification information and second identification information received from the external imaging device.

Further, a sixth technique is a control program for causing a computer to implement a terminal device control method that includes: transmitting first identification information in which imaging device identification information that is received from an external imaging device and is for identifying the external imaging device, and terminal device identification information for identifying the terminal device are associated with each other; and performing control to receive a return video image transmitted by an external information processing device on the basis of a result of determination made as to whether or not the terminal device and the imaging device are associated with each other on the basis of the first identification information and second identification information received from the external imaging device.

BRIEF DESCRIPTION OF DRAWINGS

FIG. 6 is an explanatory diagram of another example of the video processing device 400.

FIG. 12 is an explanatory diagram of a first mode of coverage in MOJO.

FIG. 13 is an explanatory diagram of a second mode of coverage in MOJO.

MODE FOR CARRYING OUT THE INVENTION

The following is a description of an embodiment of the present technology, with reference to the drawings. Note that explanation will be made in the following order.
<1. Embodiment>
[1-1. Configuration of an information processing system 10]
[1-2. Configuration of an imaging device 100]
[1-3. Configuration of a terminal device 200]
[1-4. Configuration of an information processing device 300]
[1-5. Processes in the information processing system 10]
<2. Example applications of the present technology>
[2-1. Configuration of MOJO]
[2-2. First mode of news gathering in MOJO]
[2-3. Second mode of news gathering in MOJO]
<3. Modifications>
<1. Embodiment>
[1-1. Configuration of an Information Processing System 10]

Figure 1:
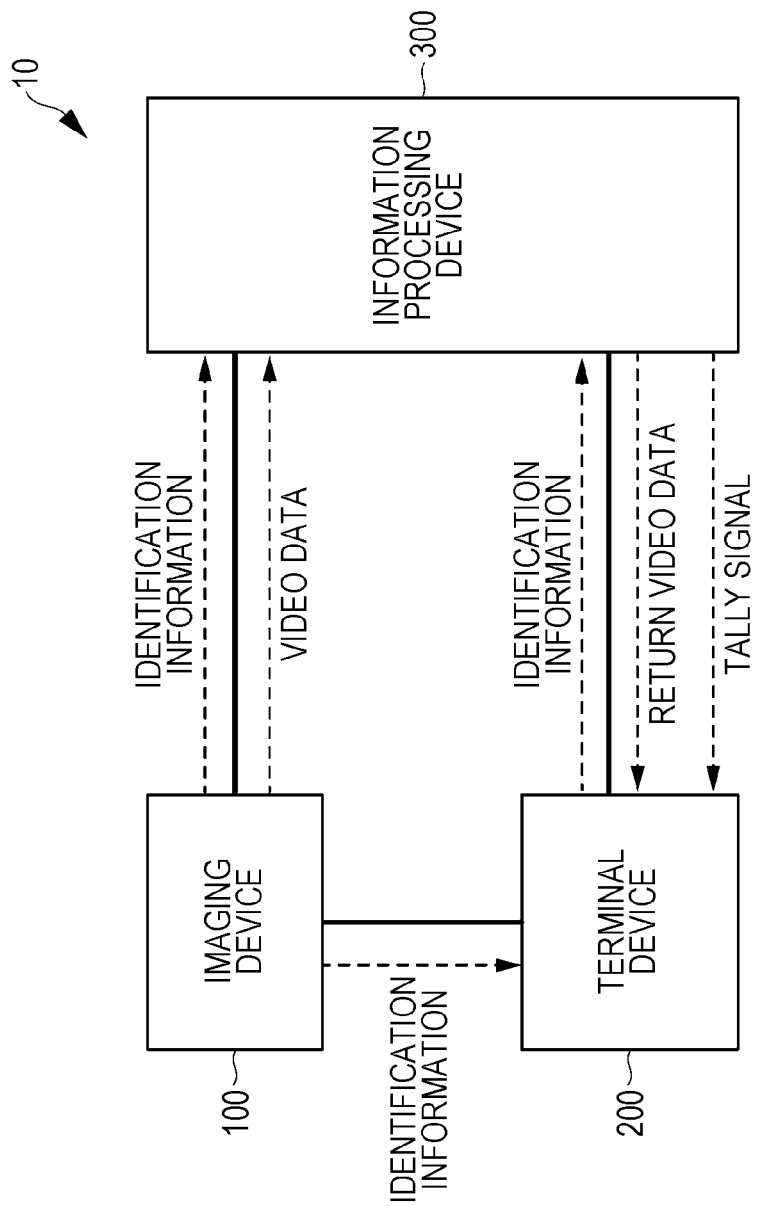
FIG. 1 is a block diagram showing the configuration of an information processing system 10.

First, the configuration of an information processing system 10 is described with reference to FIG. 1. The information processing system 10 includes an imaging device 100, a terminal device 200, and an information processing device 300. The terminal device 200 and the information processing device 300, and the imaging device 100 and the information processing device 300 are connected via a network such as the Internet. Further, the terminal device 200 and the imaging device 100 are connected by near field communication or the like, for example, and are associated with each other.

The imaging device 100 captures a video image or an image, and transmits the video data or the image data to the information processing device 300. Note that this embodiment is described as an example case where video data is transmitted from the imaging device 100.

The terminal device 200 receives, from the information processing device 300, return video data that is the video image being broadcast, and displays the return video data, to let the user (a news gatherer) view the return video data.

The information processing device 300 receives video data transmitted from the imaging device 100, and transmits the video data to a switcher of an external video processing device that performs a predetermined broadcasting editing process to generate return video data. The information processing device 300 also transmits the return video data, which has been generated by the external video processing device and been transmitted from the switcher, to the terminal device 200. Note that both the video data and the return video data may or may not include audio data.

This information processing system 10 is used in a system that broadcasts video images captured by the imaging device 100, for example. In a case where a video image captured by the imaging device 100 is transmitted to the information processing device 300, and the video data is broadcast, the video data processed for broadcasting is transmitted as return video data to the terminal device 200.

[1-2. Configuration of the Imaging Device 100]

Figure 2:
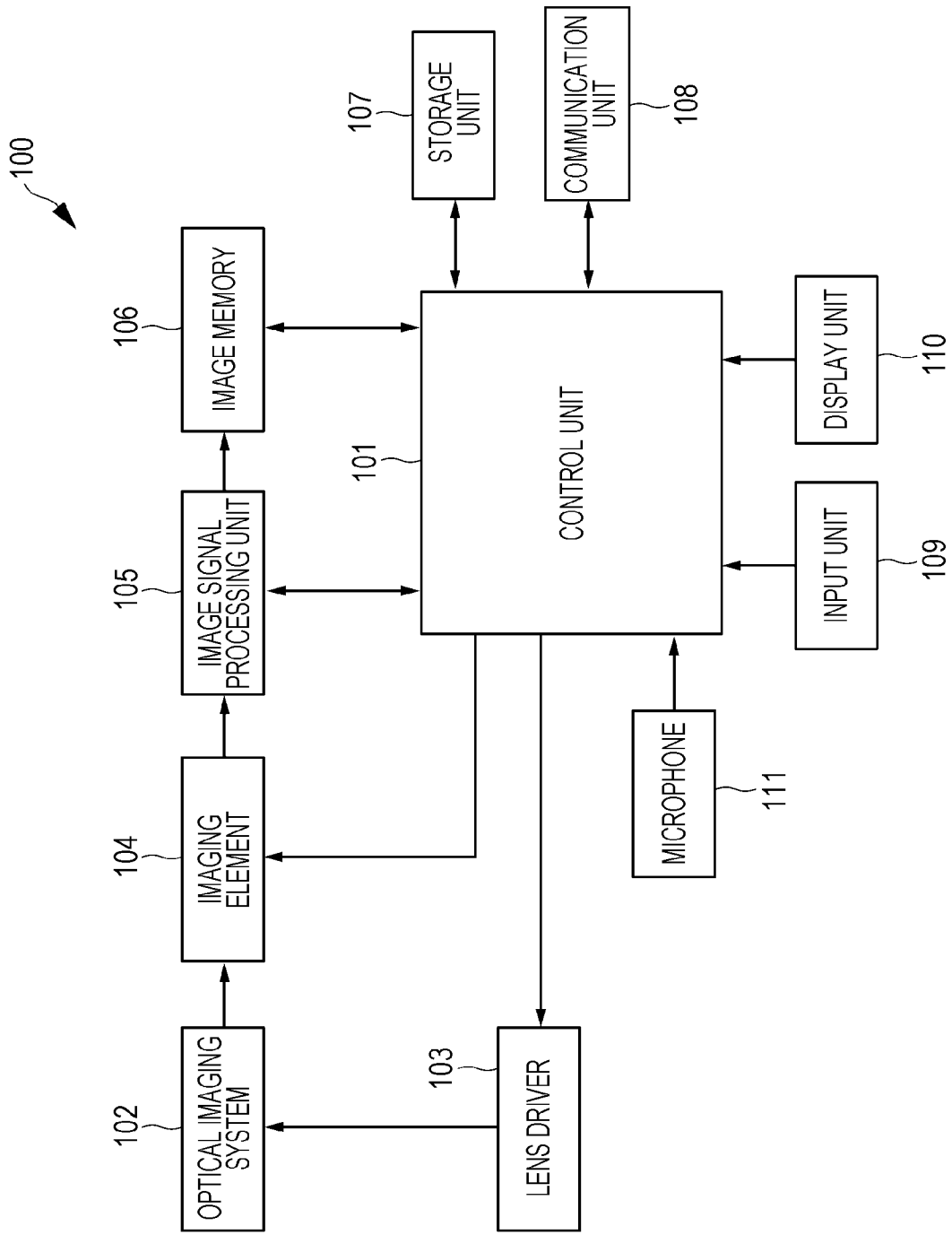
FIG. 2 is a block diagram showing the configuration of an imaging device 100.

Next, the configuration of the imaging device 100 is described with reference to the block diagram shown in FIG. 2. The imaging device 100 includes a control unit 101, an optical imaging system 102, a lens driver 103, an imaging element 104, an image signal processing unit 105, an image memory 106, a storage unit 107, a communication unit 108, an input unit 109, a display unit 110, and a microphone 111.

The control unit 101 includes a central processing unit (CPU), a random access memory (RAM), a read only memory (ROM), and the like. The CPU controls the entire imaging device 100 and the respective components by performing various processes and issuing commands according to a program stored in the ROM. Also, the control unit 101 stores imaging device identification information that is for identifying the imaging device 100, and is required to connect to the terminal device 200 and the information processing device 300. The control unit 101 controls connection to the terminal device 200 and the information processing device 300 via the communication unit 108. Further, the control unit 101 stores imaging device function information indicating the functions of the imaging device 100, and the imaging device function information is transmitted to the information processing device 300 via the communication unit 108 after connection between the imaging device 100 and the information processing device 300 is established. The functions of the imaging device 100 indicated by the imaging device function information include a video data transmission function, a video display function, a voice call function, and a tally signal presentation function.

The optical imaging system 102 includes an imaging lens for gathering light from an object onto the imaging element 104, a drive mechanism for moving the imaging lens to perform focusing and zooming, a shutter mechanism, an iris mechanism, and the like. These components are driven on the basis of control signals from the control unit 101 and the lens driver 103. An optical image of the object obtained through the optical imaging system 102 is formed on the imaging element 104.

The lens driver 103 is formed with a microcomputer or the like, for example, and, under the control of the control unit 101, performs autofocusing by moving the imaging lens a predetermined amount in the optical axis direction, to achieve focusing on the target object. Under the control of the control unit 101, the lens driver 103 also controls operations of the drive mechanism, the shutter mechanism, the iris mechanism, and the like of the optical imaging system 102. Thus, the exposure time (the shutter speed), the aperture value (the F-number), and the like are adjusted.

The imaging element 104 photoelectrically converts incident light obtained from the object through the imaging lens into a charge amount, and outputs an imaging signal. The imaging element 104 then outputs the pixel signal to the image signal processing unit 105. The imaging element 104 is a charge coupled device (CCD), a complementary metal oxide semiconductor (CMOS), or the like.

The image signal processing unit 105 performs a sample-and-hold process for maintaining a preferable signal-to-noise (S/N) ratio through a correlated double sampling (CDS) process, an auto gain control (AGC) process, analog-to-digital (A/D) conversion, and the like on the imaging signal output from the imaging element 104, to create an image signal. The image signal processing unit 105 also performs a recording process on an image signal for recording, and a display process on an image signal for display.

The image memory 106 is a buffer memory formed with a volatile memory such as a dynamic random access memory (DRAM), for example. The image memory 106 temporarily stores image data subjected to predetermined processing by the image signal processing unit 105.

The storage unit 107 is a large-capacity storage medium such as a hard disk or a flash memory, for example. The image signal subjected to image processing for recording by the image signal processing unit 105 is stored in a compressed state or an uncompressed state on the basis of a standard such as Joint Photographic Experts Group (JPEG), for example. Further, Exchangeable Image File Format (EXIF) data including additional information, such as information about the stored image, imaging positional information indicating the imaging position, and imaging time information indicating the imaging date and time, is also associated with the image and stored.

The communication unit 108 is a communication module for transmitting and receiving various kinds of data and various kinds of information to and from the terminal device 200 and the information processing device 300. Any method can be used for communication, as long as the method enables connection to the Internet including a wireless local area network (LAN), a wide area network (WAN), Wireless Fidelity (WiFi), a fourth generation mobile communication system (4G), a fifth generation mobile communication system (5G), and a broadband, and other devices. Note that communication between the imaging device 100 and the terminal device 200 may be short-range wireless communication such as near field communication (NFC) or ZigBee (registered trademark), or tethering connection such as WiFi tethering, universal serial bus (USB) tethering, or Bluetooth (registered trademark) tethering.

The input unit 109 is designed for the user to give various instructions to the imaging device 100. When an input to the input unit 109 is made by the user, a control signal corresponding to the input is generated and supplied to the control unit 101. The control unit 101 then performs various processes corresponding to the control signal. The input unit 204 may include not only a shutter button for a shutter input and physical buttons for various operations, but also a touch panel, a touch screen integrally formed with a display as the display unit 110, or the like.

The display unit 110 is a display device that is a display or the like that displays a through-lens image that is an image signal for display that has been processed for display by the image signal processing unit 105, an image/video image that has been subjected to image processing for recording by the image signal processing unit 105 and is stored in the storage unit 107, a graphical user interface (GUI), or the like.

The microphone 111 is designed for recording sound in video imaging.

The imaging device 100 is formed as described above. The imaging device 100 may be a device focused on camera functions, such as a digital camera, a single-lens reflex camera, a camcorder, a camera for professional use, or imaging equipment for professional use. Other than such a device, it may be a smartphone, a tablet terminal, a wearable device, a portable game machine, or the like having camera functions.

[1-3. Configuration of the Terminal Device 200]

Figure 3:
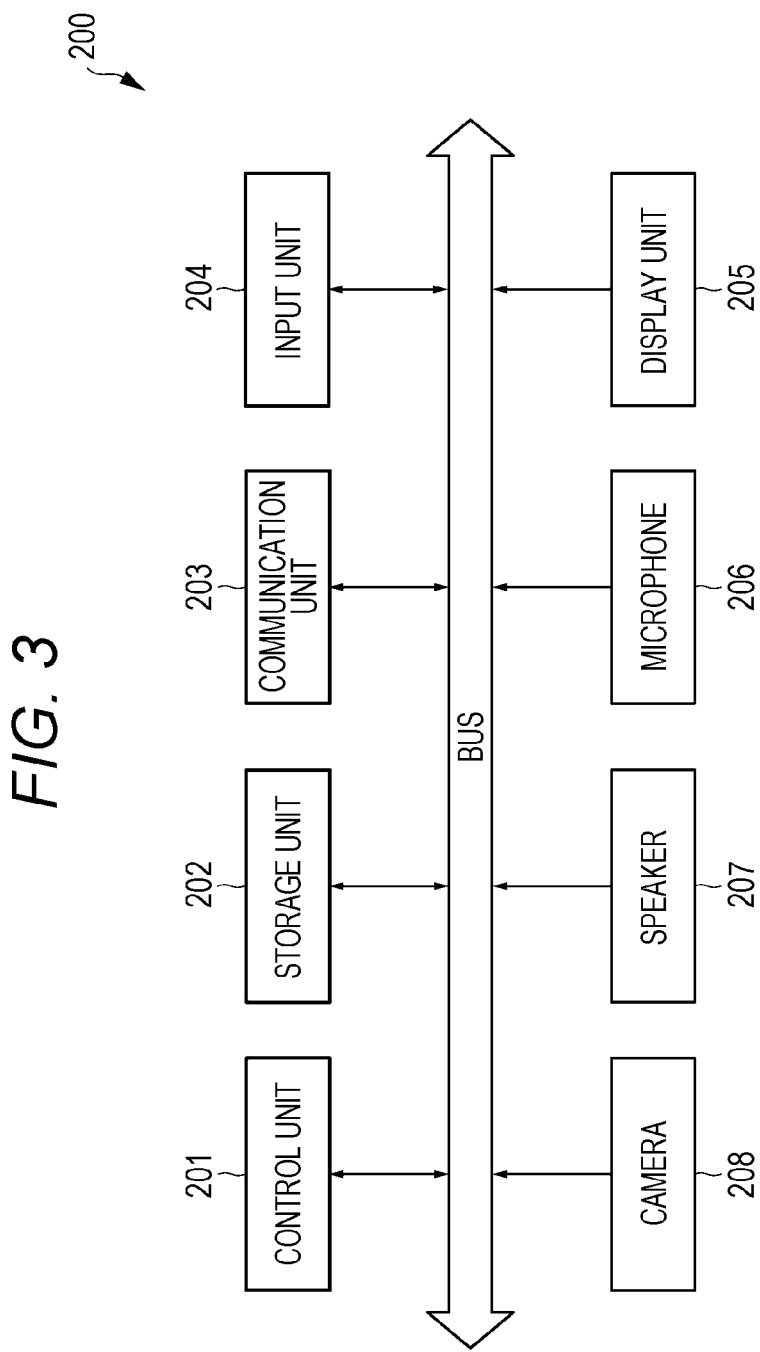
FIG. 3 is a block diagram showing the configuration of a terminal device 200.

Next, the configuration of the terminal device 200 is described with reference to FIG. 3. The terminal device 200 includes a control unit 201, a storage unit 202, a communication unit 203, an input unit 204, a display unit 205, a microphone 206, a speaker 207, and a camera 208.

The control unit 201 includes a CPU, a RAM, a ROM, and the like. The CPU controls the entire terminal device 200 and the respective components by performing various processes and issuing commands according to a program stored in the ROM. Also, the control unit 201 stores terminal device identification information that is for identifying the terminal device 200, and is required to connect to the imaging device 100 and the information processing device 300. The control unit 201 controls connection to the imaging device 100 and the information processing device 300 via the communication unit 203.

Further, the control unit 201 stores terminal device function information indicating the functions of the terminal device 200, and the terminal device function information is transmitted to the information processing device 300 via the communication unit 203 after connection between the terminal device 200 and the information processing device 300 is established. The functions of the terminal device 200 indicated by the terminal device function information include a return video data display function, a video display function, a voice call function, and a tally signal presentation function. The return video display function information in the claims is included in the terminal device function information. When the control unit 201 receives the imaging device identification information from the imaging device 100, the control unit 201 also stores the imaging device identification information therein. Further, the control unit 201 performs control to receive return video data and a tally signal transmitted from the information processing device 300 via the communication unit 203.

The storage unit 202 is a large-capacity storage medium such as a hard disk or a flash memory, for example. Various kinds of applications and data that are used in the terminal device 200 are stored in the storage unit 202.

The communication unit 203 is a communication module for transmitting and receiving data and various kinds of information to and from the terminal device 200 and the information processing device 300. Any method can be used for communication, as long as it enables connection to the Internet including a wireless LAN, a WAN, WiFi, 4G, 5G, and a broadband, and other devices. Note that communication between the terminal device 200 and the imaging device 100 may be short-range wireless communication such as NFC or ZigBee (registered trademark), or tethering connection such as WiFi tethering, USB tethering, or Bluetooth (registered trademark) tethering.

The input unit 204 is designed for the user to input information and messages to the terminal device 200, and to give various instructions. When an input to the input unit 204 is made by the user, a control signal corresponding to the input is generated and supplied to the control unit 201. The control unit 201 then performs various processes corresponding to the control signal. The input unit 204 may include not only physical buttons but also a touch panel, a touch screen integrally formed with a display as the display unit 205, or the like.

The display unit 205 is a display device such as a display that displays a video image, an image, a GUI, or the like. Return video data transmitted from the information processing device 300 is displayed on the display unit 205. This allows the user to check the return video image.

The microphone 206 is used by the user to input voice to the terminal device 200. The microphone 206 is also used as an audio input device in a voice call or a video call between the terminal device 200 and the information processing device 300.

The speaker 207 is an audio output device that outputs an audio message, the sound of a video image, or the like. The speaker 207 is also used as an audio output device in a voice call or a video call between the terminal device 200 and the information processing device 300.

The camera 208 includes a lens, an imaging element, a video signal processing circuit, and the like, and is designed for capturing a video image or an image.

The terminal device 200 is formed as described above. Specific examples of the terminal device 200 include a smartphone, a tablet terminal, a personal computer, a wearable device, a portable game machine, and the like, for example. The configuration for performing processes in the terminal device 200 may be realized by a program.

[1-4. Configuration of the Information Processing Device 300]

Figure 4:
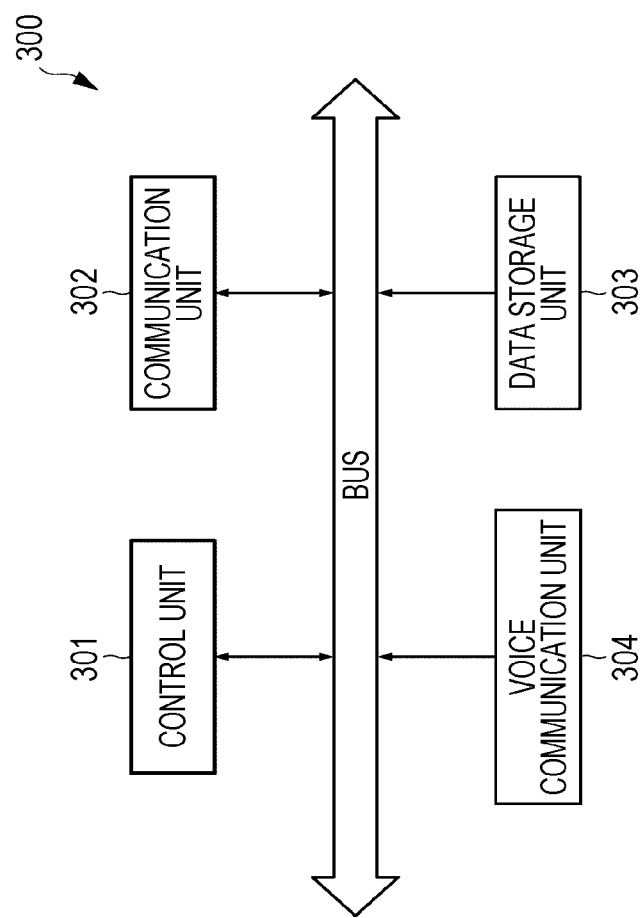
FIG. 4 is a block diagram showing the configuration of an information processing device 300.

Next, the configuration of the information processing device 300 is described with reference to the block diagram shown in FIG. 4. The information processing device 300 includes a control unit 301, a communication unit 302, a data storage unit 303, and a voice communication unit 304.

The control unit 301 includes a CPU, a RAM, a ROM, and the like, and the CPU controls the entire information processing device 300 and the respective components by performing various processes and issuing commands according to a program stored in the ROM. The control unit 301 also performs a process of determining matching between the terminal device 200 and the information processing device 300, and a process of matching between the imaging device 100 and the information processing device 300. The matching determination process will be described later in detail.

The control unit 301 also performs a reception process of receiving information transmitted from the imaging device 100 and/or the terminal device 200 via the communication unit 302, and video data transmitted from the imaging device 100.

Further, the control unit 301 checks pairing (association) between the terminal device 200 and the imaging device 100 on the basis of the imaging device identification information and the terminal device identification information received from the terminal device 200 and the imaging device identification information received from the imaging device 100, and then set the terminal device 100 as the destination of transmission of return video data and a tally signal. The control unit 301 then performs a transmission process of transmitting the return video data and the tally signal to the terminal device 200 via the communication unit 302.

The reception process is a process of receiving the imaging device identification information for identifying the imaging device 100 and/or the terminal device identification information for identifying the terminal device 200, and then storing the information into the control unit 301. Identification information includes the serial number of the device, the name of the model, or the like. Identification information may be a device-specific identification number such as an international mobile equipment identifier (IMEI), or any kind of information that can identify an individual device, such as ID information dedicated to identifying a device. Note that the first identification information in the claims includes the terminal device identification information for identifying the terminal device 200 and the imaging device identification information for identifying the imaging device 100, and the second identification information includes the imaging device identification information.

The reception process also includes a process of receiving the imaging device function information that is transmitted from the imaging device 100 and indicates the functions of the imaging device 100, and/or the terminal device function information that is transmitted from the terminal device 200 and indicates the functions of the terminal device 200, and then storing the information into the control unit 301. The functions of the imaging device 100 indicated by the imaging device function information include a video data transmission function, a video display function, a voice call function, and a tally signal presentation function. The imaging device function information is stored in the control unit 101 of the imaging device 100. The functions of the terminal device 200 indicated by the terminal device function information include a return video data display function, a video display function, a voice call function, and a tally signal presentation function. The terminal device function information is stored in the control unit 201 of the terminal device 200.

Further, in the reception process, video data transmitted from the imaging device 100 is received. The received video data is transmitted to a video processing device that performs an editing process for predetermined broadcasting.

The transmission process is a process of transmitting the return video data generated by the video processing device performing a predetermined broadcast editing process on the video data, to the terminal device 200 via the communication unit 302.

In the transmission process, a tally signal is further transmitted to the imaging device 100 and/or the terminal device 200. A tally signal is a signal for transmitting which video image is currently being broadcast, to which imaging device 100 the video image is to be broadcast next (or who has captured the video image), and the like. For example, a tally signal is generated in an external video processing device, and is transmitted to the communication unit 302 from a switcher of the video processing device.

The communication unit 302 is a communication module for transmitting and receiving various kinds of data, various kinds of information, and the like to and from the imaging device 100 and the terminal device 200. The communication method may be a wireless LAN, a WAN, WiFi, 4G, 5G, or the like.

The data storage unit 303 stores and manages the received video data, the identification information and the function information about the imaging device 100 and the terminal device 200. In addition to the video data, the data storage unit 303 may also store and manage the return video data associated with the video data. The information processing device 300 may transmit the video data and the return video data stored in the data storage unit 303 as an archive to the imaging device 100 and the terminal device 200, as needed or requested.

The voice communication unit 304 performs a process of transmitting/receiving the audio data for making a voice call with the imaging device 100 and/or the terminal device 200 via the communication unit 302.

The information processing device 300 is formed as described above. The information processing device 300 may be formed with a program, and the program may be installed beforehand in a server or the like, or may be downloaded and distributed in the form of a storage medium or the like and be installed into a server or the like by the user. Alternatively, the information processing device 300 may be formed on the cloud. Further, the information processing device 300 may be formed not only with a program, but also with a dedicated device, a circuit, or the like formed with hardware having the functions.

Figure 5:
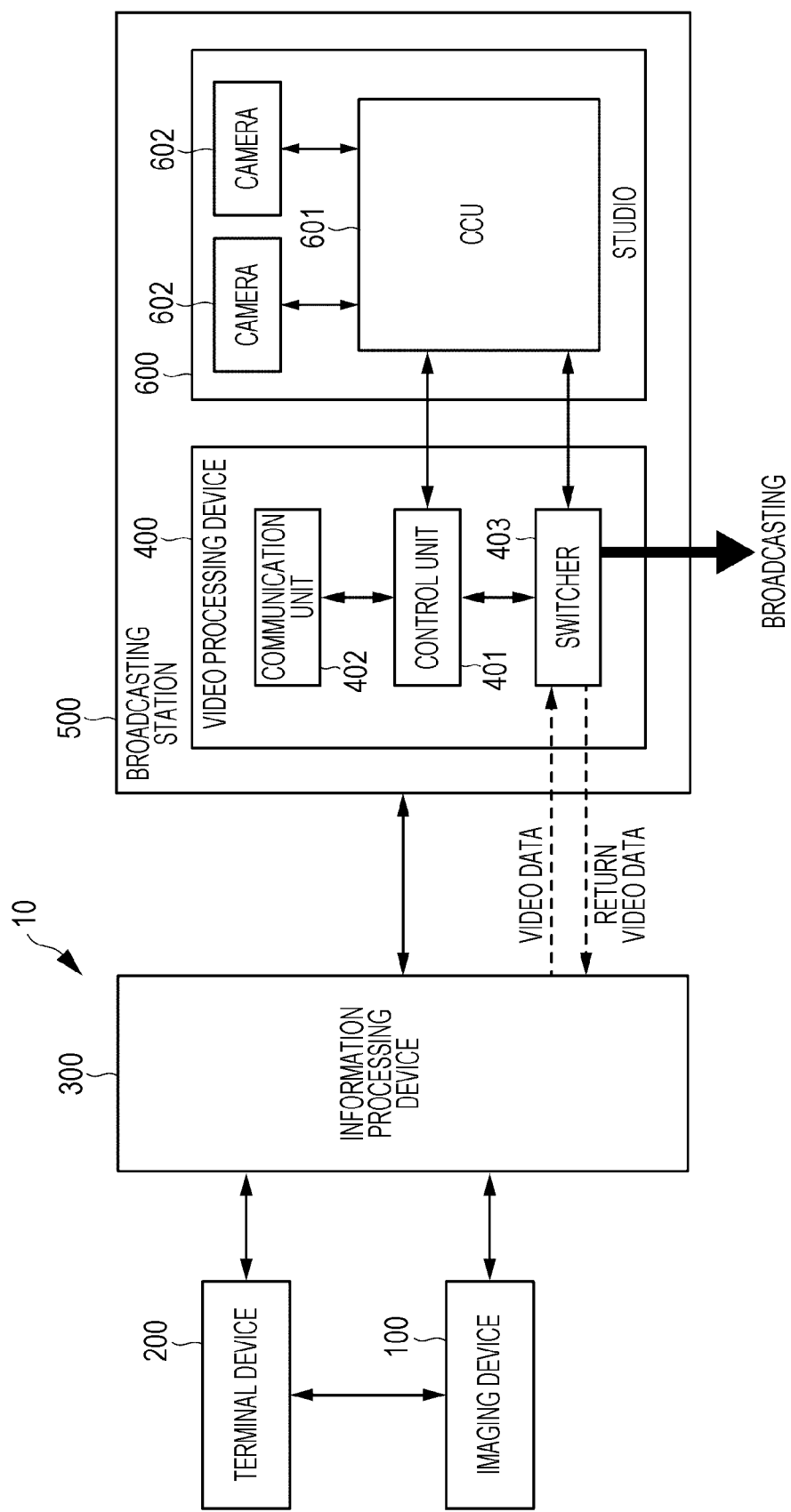
FIG. 5 is an explanatory diagram of a video processing device 400.

Note that, as shown in FIG. 5, the information processing device 300 is connected to an external video processing device 400 that performs an editing process for broadcasting on the video data. The video processing device 400 includes at least a control unit 401, a communication unit 402, and a switcher 403, and operates in a broadcasting station 500, for example. Also, a studio 600 is set in the broadcasting station 500.

In the studio 600, a producer, a director, an assistant director, a camera operator, and the like (hereinafter collectively referred to as the staff) of broadcasting station 500 perform work for broadcasting. The studio 600 also includes at least a CCU 601 and cameras 602. The CCU 601 processes and outputs video images captured by the cameras 602, and transmits the video data and the like. The cameras 602 capture images of the anchor and the like reporting news from the studio 600.

The control unit 401 includes a CPU, a RAM, a ROM, and the like, and the CPU controls the entire video processing device 400 and the respective components by performing various processes and issuing commands according to a program stored in the ROM. The control unit 401 also performs a video editing process for broadcasting. The editing process includes video division and integration, cropping, trimming, editing, subtitling, CG composition, and effect addition, for example. However, the editing process for broadcasting is not limited to these processes, and any process to be performed for broadcasting video data may be used.

The communication unit 402 is a communication module for transmitting and receiving various kinds of data, various kinds of information, and the like to and from the information processing device 300 and the like. The communication method may be a wireless LAN, a WAN, WiFi, 4G, 5G, or the like.

The switcher 403 is a device that switches or mixes a plurality of input signals. In a case where there is a plurality of imaging devices 100, video data captured by the plurality of imaging devices 100 and transmitted to the video processing device 400 via the information processing device 300 is collected in the switcher 403. The video data of an imaging device 100 to be used for broadcasting is then selected by switching performed by the switcher 403. Further, the switcher 403 transmits return video data to the information processing device 300 when the video processing device 400 generates the return video data by performing an editing process for broadcasting on the video data. The return video data is transmitted to the terminal device 200 via the information processing device 300.

The video processing device 400 may be formed with hardware, or may be formed with a program. In the latter case, the program may be installed in a server or the like that has the functions of the information processing device 300, may be installed in another server, or may be formed in the cloud.

Note that, as shown in FIG. 6A, the video processing device 400 may have the functions of the information processing device 300, or, as shown in FIG. 6B, the information processing device 300 may have the functions of the video processing device 400. Although the broadcasting station and the studio are not shown in FIG. 6, the information processing device 300 and the video processing device 400 may operate in a broadcasting station as in FIG. 5.

[1-5. Processes in the Information Processing System 10]

Figure 7:
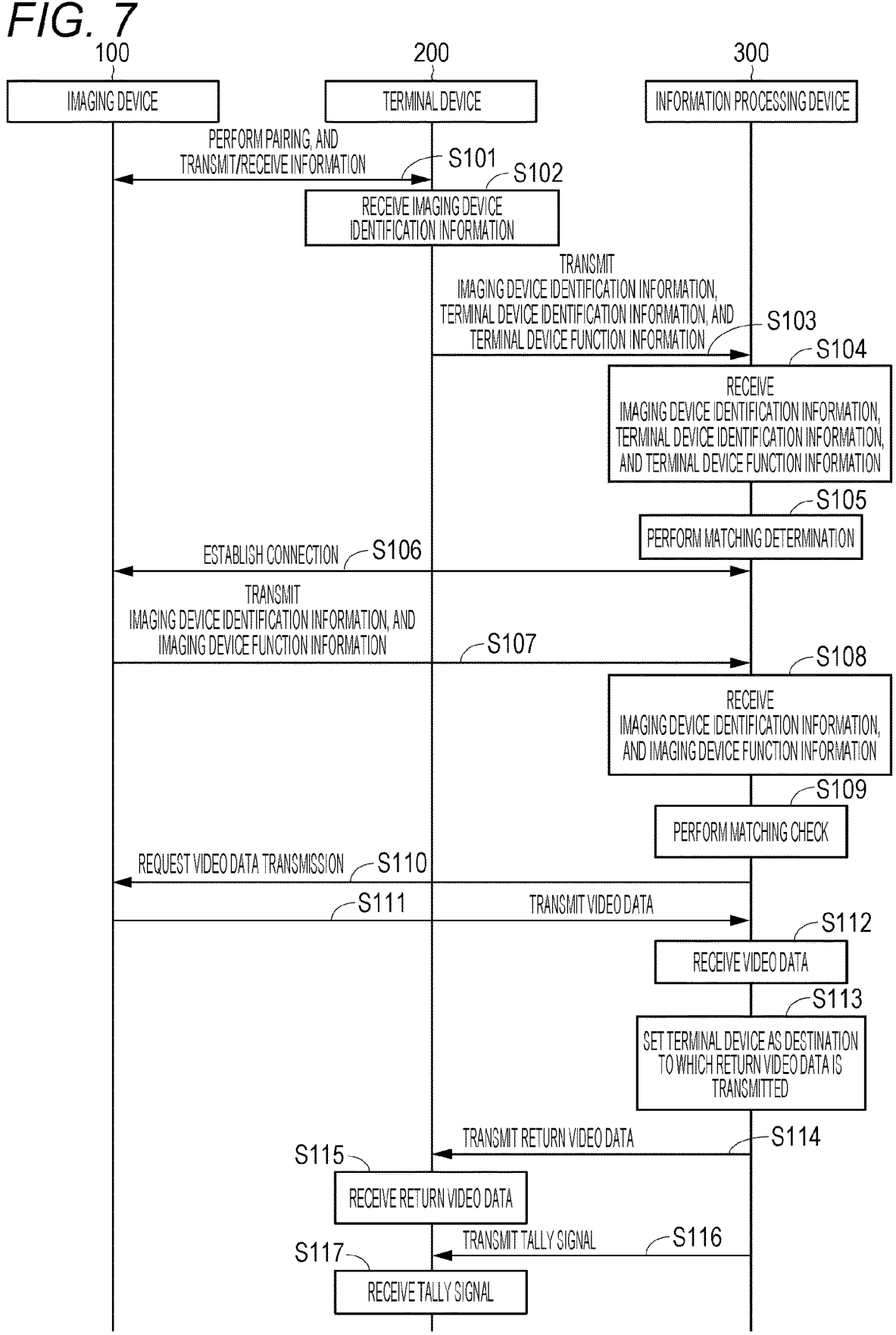
FIG. 7 is a sequence diagram showing a first example of processes in the information processing system 10.

Next, a first example of processes in the information processing system 10 is described with reference to the sequence diagram shown in FIG. 7. The first example in FIG. 7 is a case where connection between the terminal device 200 and the information processing device 300 is established before with the imaging device 100.

First, as shown in step S101, pairing (an associating process) and information transmission/reception are performed between the imaging device 100 and the terminal device 200. In a case where NFC is used, for example, pairing can be performed by bringing devices having an NFC function into contact with each other. In the case of various kinds of tethering, pairing is performed by exchanging necessary information such as authentication codes, session keys, service set identifiers (SSID), and identification information like serial numbers, between devices. As a result, the terminal device 200 and the imaging device 100 are paired to establish short-range wireless communication. In this pairing, the imaging device identification information about the imaging device 100 is transmitted to the terminal device 200, and the terminal device 200 receives the imaging device identification information in step S102. The imaging device identification information received by the terminal device 200 is stored into the control unit 201.

Next, as shown in step S103, the terminal device 200 issues a connection request to the information processing device 300, and transmits the imaging device identification information, terminal device identification information, and terminal device function information to the information processing device 300. The information processing device 300 receives the imaging device identification information, the terminal device identification information, and the terminal device function information in step S104. The terminal device 200 recognizes the information processing device 300 to be connected in advance, and, on the basis of the recognition, the terminal device 200 issues a connection request to the information processing device 300. The terminal device 200 and the information processing device 300 being connected to each other means that the information processing device 300 has identified the terminal device 200, or has received the terminal device identification information.

Next, as shown in step S105, the information processing device 300 starts performing matching determination. The matching determination is a process of checking whether the imaging device 100 and the terminal device 200, which are already connected to the information processing device 300, are paired (or associated with each other), on the basis of the identification information transmitted from the terminal device 200. Through this process, it is possible to check that the destination of the return video data based on the video data transmitted from the imaging device 100 is the terminal device 200 paired with the imaging device 100.

The matching determination can be performed by checking whether the imaging device identification information about the imaging device 100 received from the terminal device 200, and the imaging device identification information received from the imaging device 100 are the same. The imaging device identification information being the same is the association condition in the claims. In a case where the imaging device identification information about the imaging device 100 received from the terminal device 200, and the imaging device identification information received from the imaging device 100 are the same, the association condition is satisfied.

Note that, in a case where the imaging device 100 is not connected to the information processing device 300, and in a case where the imaging device 100 has not yet transmitted the imaging device identification information to the information processing device 300, the result shows "no matching". In a case where the result of the matching determination is "no matching", the result is transmitted to the imaging device 100 and/or the terminal device 200, to notify the user of the result by display or the like.

In a case where connection between the imaging device 100 and the information processing device 300 is established as shown in step S106, the imaging device 100 then transmits the imaging device identification information and imaging device function information to the information processing device 300 as shown in step S107. In step S108, the information processing device 300 then receives the imaging device identification information and the imaging device function information.

Next, a matching check is performed as shown in step S109. In a case where the imaging device 100 and the terminal device 200 are paired, the result shows "matching". Note that the information processing device 300 may collectively recognize the paired terminal device 200 and imaging device 100 as one device, and display the paired devices on the UI.

In a case where connection between the information processing device 300 and the imaging device 100 is established, the information processing device 300 then issues a video data transmission request to the imaging device 100 as shown in step S110. Note that a video data transmission request can be made at any timing as long as connection between the information processing device 300 and the imaging device 100 is established, and therefore, the video data transmission request is not necessarily made at the timing described in this embodiment.

The imaging device 100 that has received the video data transmission request transmits video data generated by imaging to the information processing device 300 as shown in step S111. In step S112, the information processing device 300 then receives the video data. The transmission and reception of video data is continued as long as the imaging device 100 continues to generate video data by performing imaging, and video data is required in broadcasting. Note that video data may be transmitted at the stage when connection between the information processing device 300 and the imaging device 100 is established, without any video data transmission request from the information processing device 300.

Next, in step S113, in a case where the result of the matching determination is "matching", and return video display function information (included in the terminal device function information) indicating that the terminal device 200 has a return video display function has been received, the control unit 301 sets the terminal device 200 as the destination of transmission of the return video data. Receiving the return video display function information indicating that the terminal device 200 has the return video display function satisfies the return video condition in the claims.

Further, in a case where the result of the matching determination is "matching", and tally signal presentation function information indicating that the terminal device 200 has a tally signal presentation function, the control unit 301 sets the terminal device 200 as the destination of transmission of a tally signal. Receiving the tally signal presentation function information indicating that the terminal device 200 has the tally signal presentation function satisfies the tally signal condition in the claims. As the setting of the destination of transmission is performed on the basis of the result of the matching determination, the setting may be performed at any time after step S109 and before transmission to the terminal device 200.

When the return video data is generated by the video processing device 400, the information processing device 300 then transmits the return video data to the terminal device 200 as shown in step S114. Since the terminal device 200 paired with the imaging device 100 has been checked by the matching determination, it has been checked that the destination of transmission of the return video data is the terminal device 200. In step S115, the terminal device 200 then receives the return video data.

The transmission and reception of the return video data is continued as long as the imaging device 100 continues to generate video data by performing imaging, and return video data is generated. However, the transmission may be stopped in a case where the terminal device 200 requests the information processing device 300 to stop transmission of return video data. Note that the return video data may be transmitted immediately after the video data is processed and the return video data is generated, regardless of whether or not there is a request, or the return video data may be transmitted only after a return video data transmission request is issued from the terminal device 200.

In parallel with the transmission of the return video data, the information processing device 300 transmits a tally signal to the terminal device 200 as shown in step S116, and the terminal device 200 receives the tally signal in step S117. Note that the transmission of the tally signal is not essential, and may be performed only when necessary.

Note that, after the connection between the terminal device 200 and the information processing device 300 is established, voice call connection may be established between the terminal device 200 and the information processing device 300. As a result, it is possible to make a report, issue an instruction, perform communication, and the like by a voice call between the person on the side of the information processing device 300 and the person using the terminal device 200.

The processes shown in FIG. 7 are performed as described above.

Figure 8:
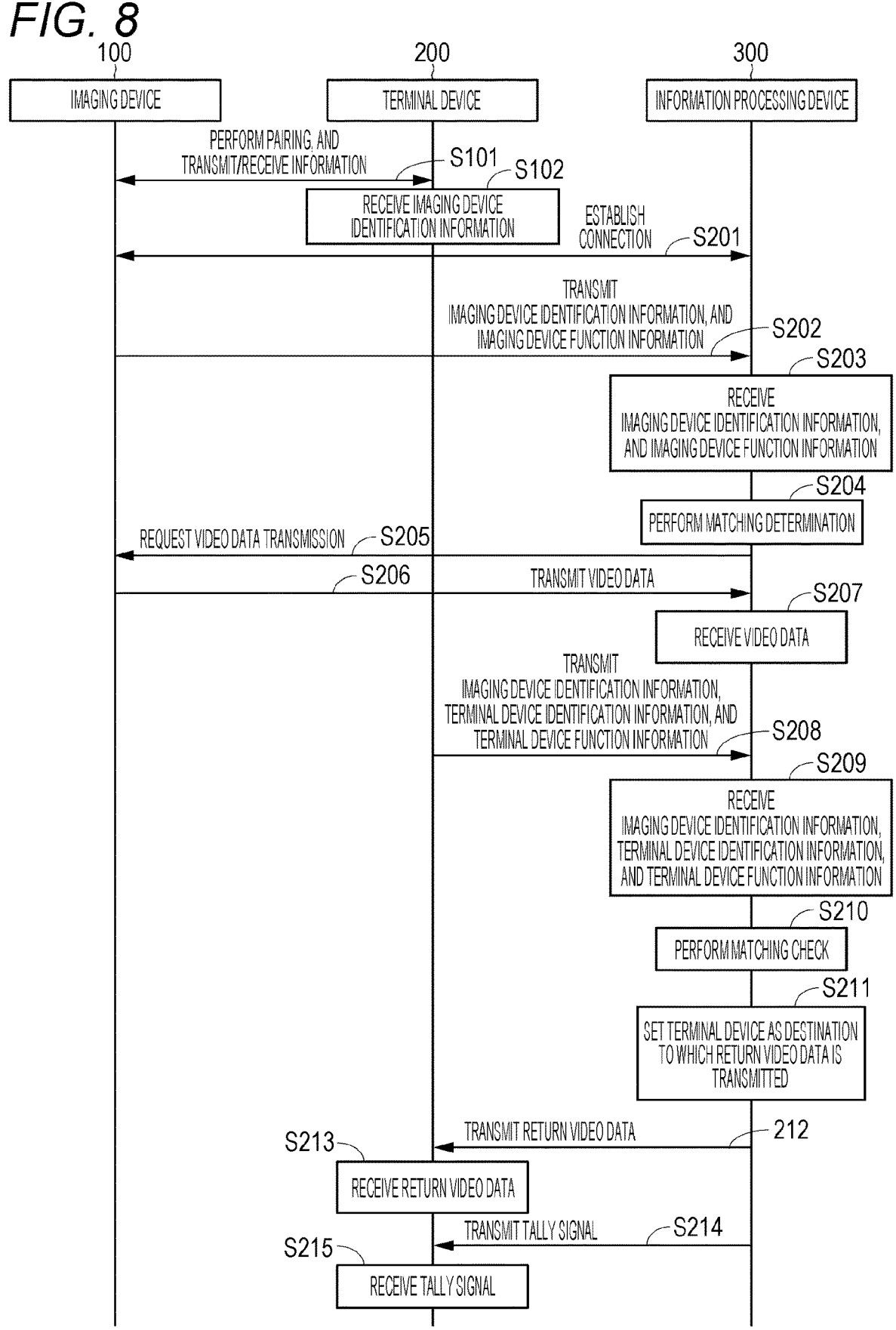
FIG. 8 is a sequence diagram showing a second example of processes in the information processing system 10.

Next, a second example of processes in the information processing system 10 is described with reference to the sequence diagram shown in FIG. 8. The second example in FIG. 8 is a case where connection between the imaging device 100 and the information processing device 300 is established before with the terminal device 200. Note that the pairing, and the transmission and reception of the imaging device identification information in steps S101 and S102 are similar to those in FIG. 7.

In a case where connection between the imaging device 100 and the information processing device 300 is established as shown in step S201, the imaging device 100 transmits the imaging device identification information and imaging device function information to the information processing device 300 as shown in step S202, and the information processing device 300 receives those pieces of information in step S203.

Next, as shown in step S204, the information processing device 300 starts performing matching determination. The matching determination is similar to that described above with reference to FIG. 7. In a case where the terminal device 200 is not connected to the information processing device 300 at this point of time, the result is "no matching".

Next, as shown in step S205, the information processing device 300 issues a video data transmission request to the imaging device 100 with which connection has already been established.

Next, as shown in step S206, the imaging device 100 that has received the video data transmission request transmits video data generated by imaging to the information processing device 300. In step S207, the information processing device 300 then receives the video data. The transmission and reception of video data is continued as long as the imaging device 100 continues to generate video data by performing imaging, and video data is required in broadcasting. Note that video data may be transmitted at the stage when matching between the information processing device 300 and the imaging device 100 is determined, without any video data transmission request from the information processing device 300.

As shown in step S208, the terminal device 200 then issues a connection request to the information processing device 300, and transmits the imaging device identification information, terminal device identification information, and terminal device function information to the information processing device 300. The information processing device 300 receives the imaging device identification information, the terminal device identification information, and the terminal device function information in step S209. The terminal device 200 recognizes the information processing device 300 to be connected in advance, and, on the basis of the recognition, the terminal device 200 issues a connection request to the information processing device 300. The terminal device 200 and the information processing device 300 being connected to each other means that the information processing device 300 has identified the terminal device 200, or has received the terminal device identification information.

Next, a matching check is performed as shown in step S210. By checking that the imaging device identification information received from the terminal device 200 and the imaging device identification information received from the imaging device 100 are the same, the information processing device 300 checks that the imaging device 100 and the terminal device 200 are paired. In a case where the imaging device 100 and the terminal device 200 are paired, the result shows "matching".

Next, in step S211, the control unit 301 sets the terminal device 200 as the destination of transmission of return video data, on the basis of the result showing "matching" in step S109 described above. The control unit 301 also sets the terminal device 200 as the destination of transmission of a tally signal.

As shown in steps S212 to S215, return video data is then transmitted and received between the information processing device 300 and the terminal device 200 as in FIG. 7, and further, a tally signal is transmitted and received in parallel with the transmission of the return video data.

Note that, after the connection between the terminal device 200 and the information processing device 300 is established, voice call connection may be established between the terminal device 200 and the information processing device 300.

The processes shown in FIG. 8 are performed as described above.

Figure 9:
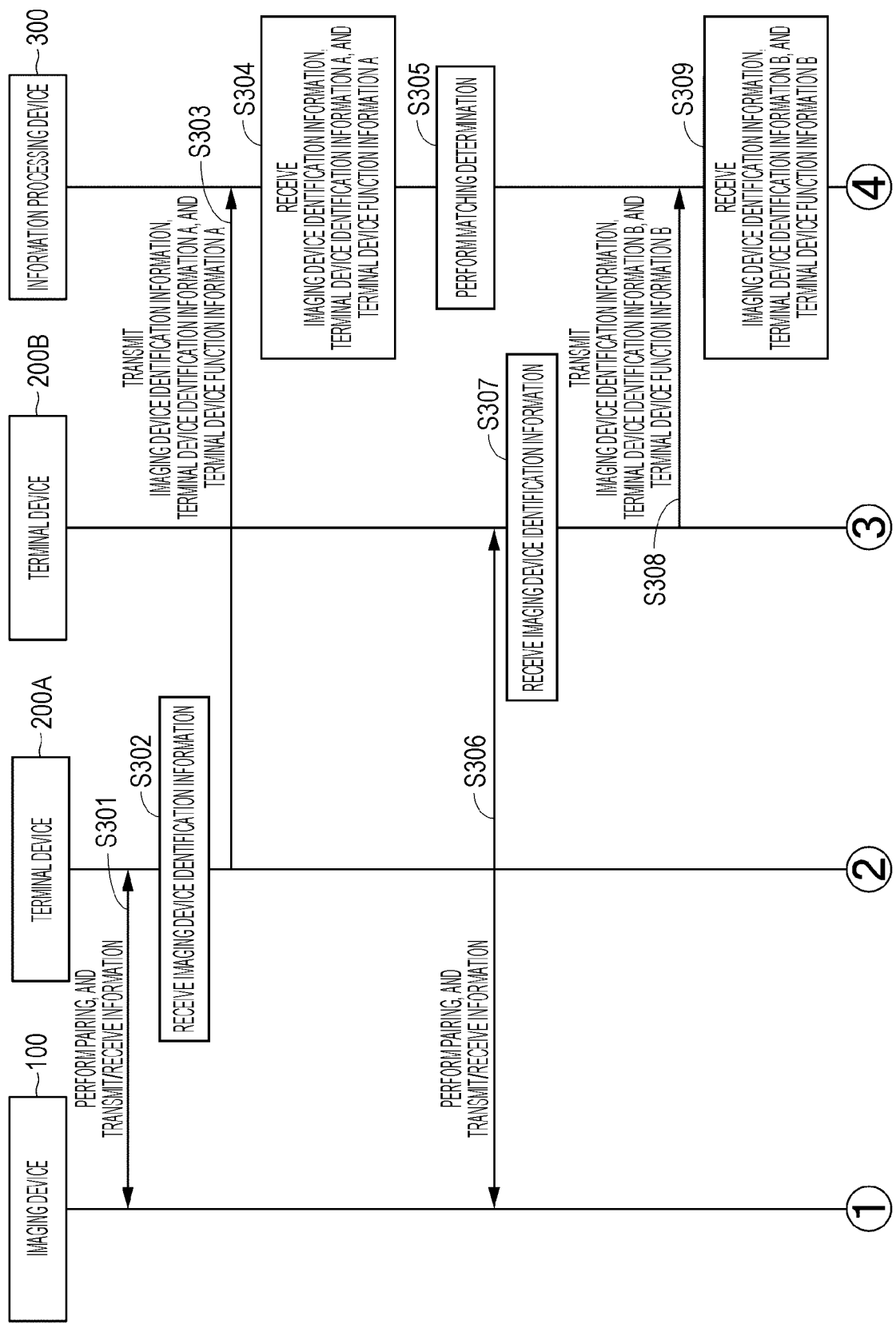
FIG. 9 is a sequence diagram showing a third example of processes in the information processing system 10.
Figure 10:
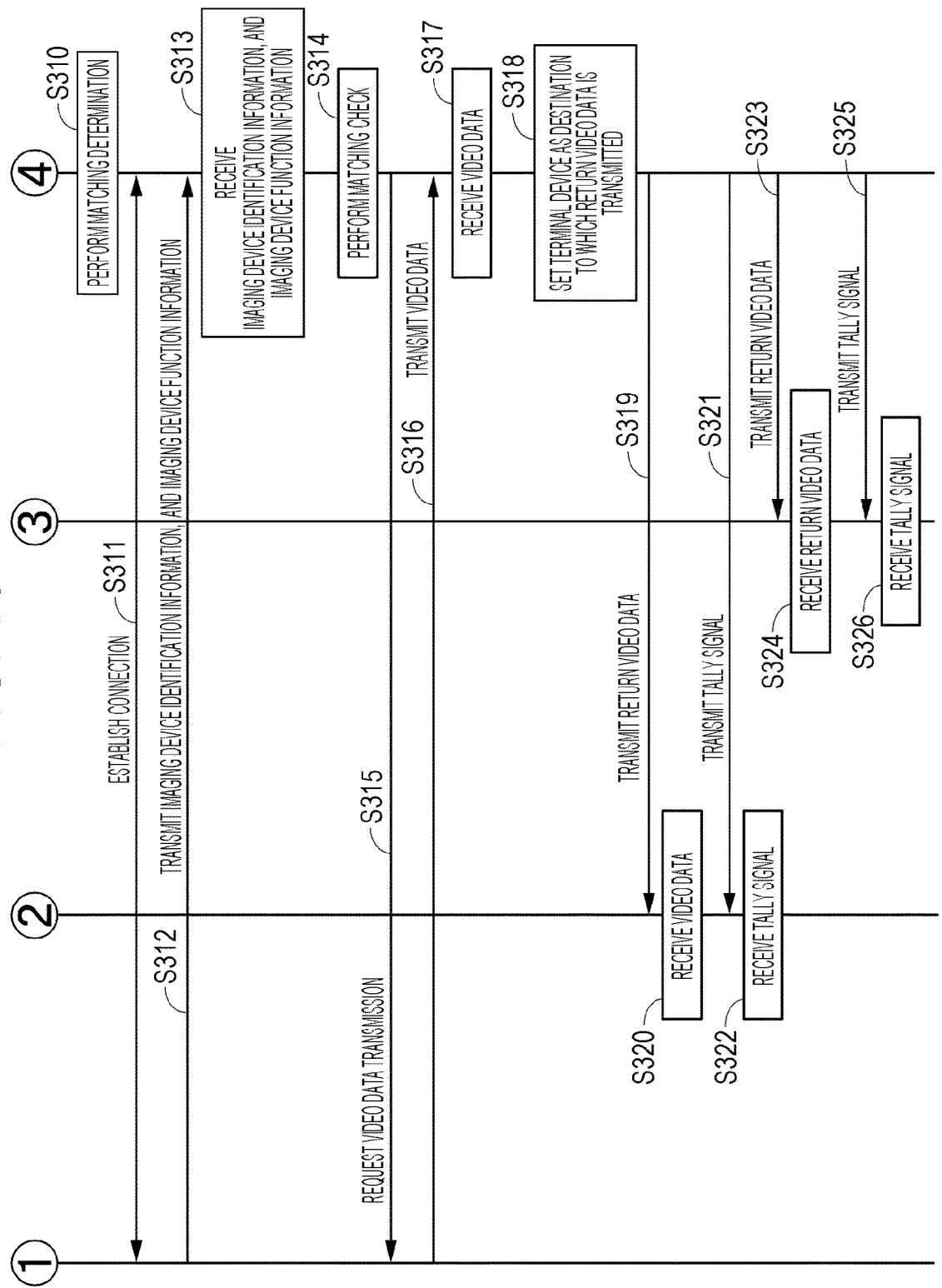
FIG. 10 is a sequence diagram showing the third example of processes in the information processing system 10.

Further, a third example of processes in the information processing system 10 is described with reference to the sequence diagrams shown in FIGS. 9 and 10. The third example shown in FIGS. 9 and 10 is a case where there is a plurality of terminal devices, and connection between the terminal devices and the information processing device 300 is established before with the imaging device 100. In the description with reference to FIGS. 9 and 10, there are two terminal devices, which are a terminal device 200A and a terminal device 200B. Further, as for identification information and function information, those regarding the terminal device 200A is referred to as terminal device identification information A and terminal device function information A, and those regarding the terminal device 200B is referred to as terminal device identification information B and terminal device function information B.

First, as shown in step S301, pairing (an association process), and information transmission and reception are performed between the imaging device 100 and the terminal device 200A, and short-range wireless communication is established by the pairing. In this pairing, the imaging device identification information about the imaging device 100 is transmitted to the terminal device 200A, and the terminal device 200A receives the imaging device identification information in step S302.

Next, as shown in step S303, the terminal device 200A issues a connection request to the information processing device 300, and transmits the imaging device identification information, the terminal device identification information A, and the terminal device function information A to the information processing device 300. The information processing device 300 receives the imaging device identification information, the terminal device identification information A, and the terminal device function information A in step S304.

Next, as shown in step S305, the information processing device 300 starts performing matching determination. In a case where the imaging device 100 is not connected to the information processing device 300, and in a case where the imaging device 100 has not yet transmitted the imaging device identification information to the information processing device 300, the result shows "no matching".

Next, as shown in step S306, when pairing is performed between the imaging device 100 and the terminal device 200B, and short-range wireless communication is established, the imaging device 100 transmits the imaging device identification information to the terminal device 200B. The terminal device 200B receives the imaging device identification information about the imaging device 100 in step S307.

As shown in step S308, in a case where connection between the terminal device 200B and the information processing device 300 is established, the terminal device 200B then transmits the imaging device identification information about the imaging device 100, and the terminal device identification information B and the terminal device function information B about the terminal device 200B to the information processing device 300. The information processing device 300 receives the imaging device identification information, the terminal device identification information B, and the terminal device function information B in step S309.

Next, as shown in step S310, the information processing device 300 performs determination. In a case where the imaging device 100 is not connected to the information processing device 300, and in a case where the imaging device 100 has not yet transmitted the imaging device identification information to the information processing device 300, the result shows "no matching".

In a case where connection between the imaging device 100 and the information processing device 300 is established as shown in step S311, the imaging device 100 then transmits its own imaging device identification information and imaging device function information to the information processing device 300 in step S312. In step S313, the information processing device 300 then receives the imaging device identification information and the imaging device function information.

Next, in step S314, the information processing device 300 checks that the imaging device identification information about the imaging device 100 received from the terminal device 200A and the imaging device identification information received from the imaging device 100 are the same in the matching determination, and thus checks that the terminal device 200A and the imaging device 100 are paired.

The information processing device 300 also checks that the imaging device identification information about the imaging device 100 received from the terminal device 200B and the imaging device identification information received from the imaging device 100 are the same in the matching determination, and thus checks that the terminal device 200B and the imaging device 100 are paired.

In a case where connection between the information processing device 300 and the imaging device 100 is established, the information processing device 300 then issues a video data transmission request to the imaging device 100 as shown in step S315.

Next, as shown in step S316, the imaging device 100 that has received the video data transmission request transmits video data generated by imaging to the information processing device 300. In step S317, the information processing device 300 then receives the video data. The transmission of video data is continued as long as the imaging device 100 continues to generate video data by performing imaging, and video data is required in broadcasting.

Next, in step S318, on the basis of the result showing "matching" in step S314 described above, the control unit 301 of the information processing device 300 sets the terminal device 200A and the terminal device 200B as the destinations of transmission of return video data. The control unit 301 also sets the terminal device 200A and the terminal device 200B as the destinations of transmission of a tally signal.

When the return video data is generated by the external video processing device 400, the information processing device 300 then transmits the return video data to the terminal device 200A as shown in step S319. In step S320, the terminal device 200A then receives the return video data. Further, in parallel with the transmission of the return video data, a tally signal transmission unit 308 transmits a tally signal from the information processing device 300 to the terminal device 200A as shown in step S321, and the terminal device 200A receives the tally signal in step S322.

Further, as shown in step S323, the information processing device 300 transmits the return video data to the terminal device 200B, and the terminal device 200B receives the return video data in step S324. Further, in parallel with the transmission of the return video data, the information processing device 300 transmits a tally signal to the terminal device 200B as shown in step S325, and the terminal device 200B receives the tally signal in step S326. Note that the transmission may be stopped in a case where the terminal device 200A and/or the terminal device 200B requests the information processing device 300 to stop the transmission of the return video data.

After connection between the terminal device 200A and the information processing device 300 is established, voice call connection may be established between the terminal device 200A and the information processing device 300. The same applies to the terminal device 200B.

The processes shown in FIGS. 9 and 10 are performed as described above. Note that, although the return video data is transmitted to the terminal device 200B after the return video data is transmitted to the terminal device 200A in FIG. 10, the return video data may be transmitted to both devices at the same time, or may be transmitted first to the terminal device 200B.

The number of terminal devices is not necessarily two, but may be any number. The example in which there is a plurality of terminal devices 200 shown in FIGS. 9 and 10 is useful in a case where there is a plurality of users involved in imaging, and a plurality of users wishes to view and check the return video data on different terminal devices.

Processes in the information processing system 10 according to the present technology are performed as described above. By these processes, the user who has transmitted video data captured with the imaging device 100 to the information processing device 300 receives return video data with the terminal device 200 and has the return video data displayed, for example. Thus, the return video image can be checked with a high visibility. That is, it is possible to check a return video image that is easier to view than in a case where both a through-lens image at a time of imaging only with the imaging device 100 and a return video image are displayed on the display unit 110 of the imaging device 100.

<2. Example Applications of the Present Technology>
[2-1. Configuration of MOJO]

Next, specific example applications of the present technology are described. The present technology can be applied to a novel journalism system called mobile journalism (MOJO).

MOJO is journalism in which journalists and ordinary citizens use terminal devices to cover and report news. With the spread of the Internet and terminal devices such as smartphones, even ordinary citizens or freelance journalists who do not own dedicated imaging devices and video editing devices can easily image, edit, and provide news materials, using applications in the terminal devices. This enables MOJO to perform more immediate news reporting than before.

First, an example configuration in a case where news coverage and reporting are performed in a MOJO format is described with reference to FIG. 11. News coverage and reporting in the MOJO format are formed with journalists 1000, a broadcasting station 2000, and a server 3000, for example. The broadcasting station 2000, the server 3000, and the imaging devices 100 and the terminal devices 200 being used by the journalists 1000 are connected via a network such as the Internet. Note that the imaging devices 100, the terminal devices 200, and the information processing device 300 are similar to those described above in the embodiment.

The journalists 1000 are persons who go to a site of news gathering, which is the scene of an incident, conduct news gathering, and provide the broadcasting station 2000 with the contents of the coverage (video data, image data, audio data, text, and the like). A journalist 1000 gathers news, using the imaging device 100 and/or the terminal device 200.

The broadcasting station 2000 is an entity and/or facilities that give news gathering instructions to the journalists 1000, edit the contents of coverage provided by the journalists 1000, and broadcast the contents.

The server 3000 is the information processing device 300 according to the present technology, and is also responsible for transmission and reception of information, data, instructions, and the like between the broadcasting station 2000 and the journalists 1000. The server 3000 may be managed and operated by the broadcasting station 2000 or by an affiliated company or an affiliated organization of the broadcasting station 2000, or may be managed and operated by a company other than the broadcasting station 2000 and be used by the broadcasting station 2000.

The server 3000 (the information processing device 300) includes the control unit 301, the communication unit 302, and the data storage unit 303.

The control unit 301 includes a CPU, a RAM, a ROM, and the like, and the CPU controls the entire information processing device 300 and the respective components by performing various processes and issuing commands according to a program stored in the ROM.

The communication unit 302 is a communication module for transmitting and receiving various kinds of data, various kinds of information, and the like to and from the imaging device 100 and the terminal device 200. The communication method may be a wireless LAN, a WAN, WiFi, 4G, 5G, or the like.

The data storage unit 303 stores and manages the received video data, the identification information and the function information about the imaging device 100 and the terminal device 200. In addition to the video data, the data storage unit 303 may also store and manage the return video data associated with the video data. The information processing device 300 may transmit the video data and the return video data stored in the data storage unit 303 as an archive to the imaging device 100 and the terminal device 200, as needed or requested.

The broadcasting station 2000 includes at least a control room 2100 and a studio 2200. In the control room 2100 and the studio 2200, a producer, a director, an assistant director, a camera operator, and the like (hereinafter collectively referred to as the staff) of broadcasting station 2000 perform work for program broadcasting.

The control room 2100 includes at least a control unit 2101, a switcher 2102, monitors 2103, and a communication unit 2104. The control unit 2101 controls the entire control room 2100 and its respective components. The control unit 2101 also transmits and receives video data between the switcher 2102 and the monitors 2103, and further transmits and receives video data between the control room 2100 and a camera control unit (CCU) 2201 of the studio 2200.

The switcher 2102 is a device that switches or mixes a plurality of input signals, and is used by the staff member in charge of switching of video images to be displayed on the monitors 2103, for example. The monitors 2103 are display devices that display various kinds of video images, such as video images yet to be broadcast, video images for broadcasting, and video images that have been processed for broadcasting.

Meanwhile, the studio 2200 also includes at least the CCU 2201 and cameras 2202. The CCU 2201 processes and outputs video images captured by the cameras 2202, and transmits the video data and the like. The cameras 2202 capture images of the anchor and the like reporting news from the studio 2200.

Figure 11:
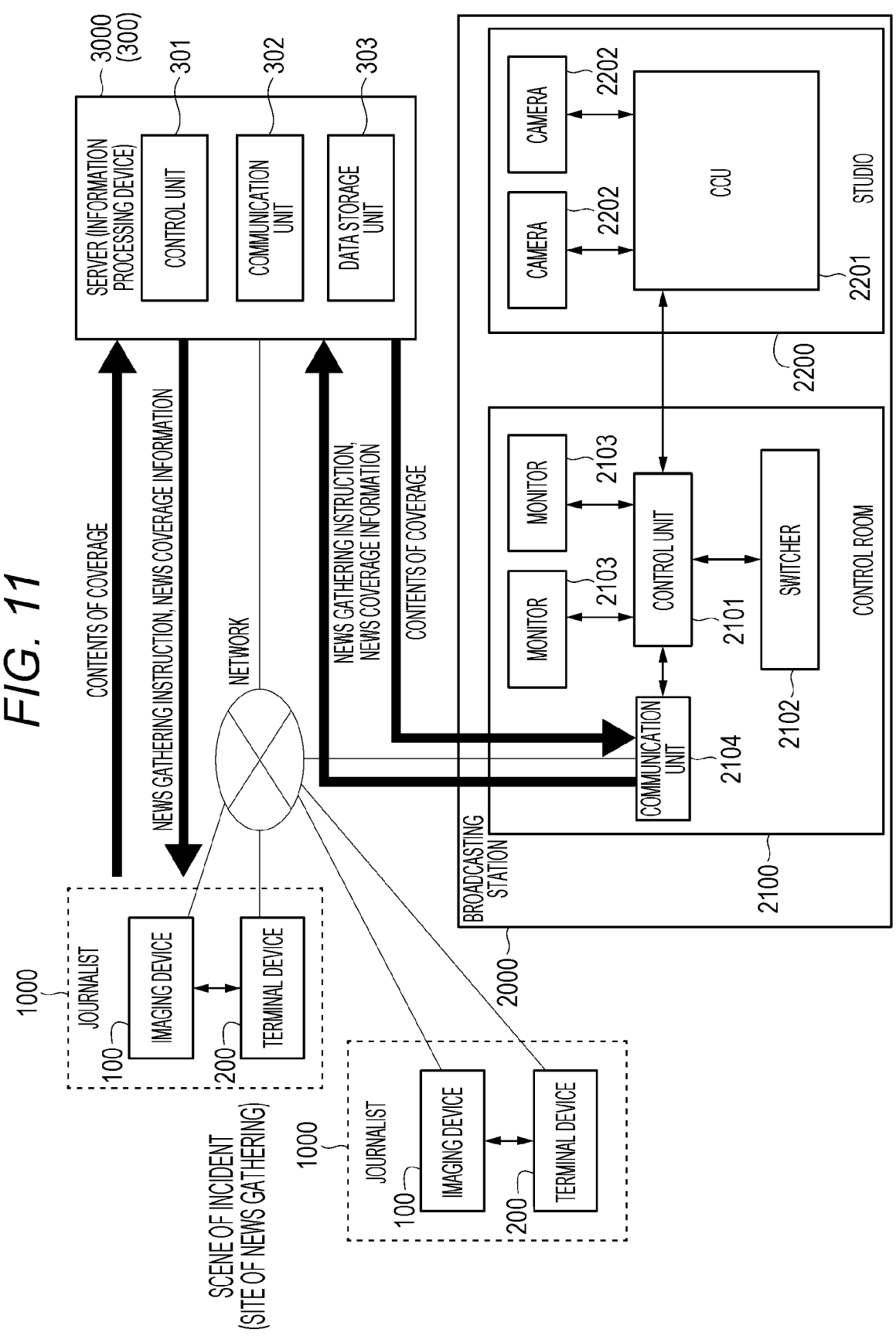
FIG. 11 is a block diagram showing an example configuration of MOJO.

As shown in FIG. 11, news gathering instructions and news coverage information are transmitted from the broadcasting station 2000 to the journalists 1000 via the server 3000, for example. The news coverage information is information that includes the date, the journalist's ID, the coverage ID, the coverage location, the title, the setting information about the imaging device, and the like, for example.

When a journalist 1000 performs news gathering on the basis of a news gathering instruction and news coverage information, the journalist 1000 then transmits the contents of the coverage to the broadcasting station 2000 via the server 3000. The contents of the coverage include a video image, a still image, sound, text, and the like obtained by the news gathering, for example.

At the broadcasting station 2000, the staff performs organizing, recording, editing, and the like of a broadcast program, on the basis of the contents of coverage transmitted from the journalists 1000, and broadcast the contents of coverage in the broadcast program.

[2-2. First Mode of News Gathering in MOJO]

Next, a first mode of news gathering in MOJO is described with reference to FIG. 12.

Journalists in MOJO include citizen journalists, video journalists, and broadcast journalists.

A citizen journalist is an ordinary citizen who provides the broadcasting station 2000 with video images he/she has captured, or posts such video images on the Internet. The spread of terminal devices such as smartphones has made it easier for ordinary citizens to capture images of incidents. Performing news gathering in a case where he/she happens to encounter the scene of an incident, a citizen journalist can perform more immediate news reporting than video journalists and broadcast journalists.

A video journalist is a staff member of the broadcasting station 2000 or a freelance journalist, and his/her profession is to provide the broadcasting station 2000 with video images captured with a device such as a smartphone or a digital camera that is more portable than imaging equipment for professional use. Thus, a video journalist can perform news reporting more quickly than broadcast journalists.

A broadcast journalist is a staff member of the broadcasting station 2000 or a freelance journalist, and his/her profession is to provide the broadcasting station 2000 with video images captured with imaging equipment for professional use. Since imaging equipment for professional use is heavier and larger than the terminal devices 200 such as smartphones and the imaging devices 100 such as general digital cameras, a broadcast journalist takes more time to get to the scene of an incident and start news gathering, than citizen journalists and video journalists. However, as imaging is performed with imaging equipment for professional use, it is possible to perform more detailed news reporting with higher image quality than video images captured by a citizen journalist or a video journalist.

FIG. 12 shows a first mode of news gathering in MOJO, in which broadcasting is performed on the basis of news gathered by a video journalist using the terminal device 200, and by a broadcast journalist using the imaging device 100 as imaging equipment for professional use.

In the first mode of news gathering, when learning of the occurrence of an incident, the broadcasting station 2000 first asks, via the server 3000 or directly, a video journalist and a broadcast journalist to gather news.

The video journalist who has received the news gathering request performs imaging and editing as news gathering, using the terminal device 200. Note that, in this example, the terminal device 200 is more mobile and portable than imaging equipment for professional use. Accordingly, the video journalist can get to the scene of the incident quicker than a broadcast journalist using imaging equipment for professional use. The broadcasting station 2000 can also ask a video journalist who is near the scene of the incident and has the terminal device 200 to gather news promptly. On the other hand, imaging equipment for professional use requires more time to prepare than the terminal device 200, and therefore, it is slower to get to the scene of the incident and perform news gathering than a broadcast journalist in some cases.

When completing the imaging and editing at the scene of the incident, the video journalist using the terminal device 200 transmits video data that is the contents of the news coverage to the broadcasting station 2000 via the server 3000. The broadcasting station 2000 that has received the video data broadcasts the first report using video images captured with the terminal device 200. This enables more immediate news reporting than that in a case where only imaging equipment for professional use is used. Such a news gathering method is suitable for reporting the contents of an incident in real time in a case where an incident occurs during live broadcasting such as a news program being broadcast during the day, for example. Note that the video journalist who uses the terminal device 200 can continue to perform imaging at the scene of the incident. Further, although a case where the terminal device 200 transmits the edited video data as the contents of coverage to the broadcasting station 2000 has been described, the editing performed by the terminal device 200 may be processing for broadcasting, for example. Alternatively, the video journalist may transmit only text data such as a reporting memo, together with video data, as the contents of coverage to the broadcasting station 2000, and the broadcasting station 2000 may perform editing such as processing for broadcasting.

When completing the imaging and editing at the scene of the incident, the broadcast journalist using the imaging equipment for professional use transmits video data to the broadcasting station 2000 via the server 3000. The broadcasting station 2000 that has received the video data performs further news reporting following the first report. Being more sophisticated than the terminal device 200, the imaging equipment for professional use can perform more specific news reporting with higher image quality than video images captured by the terminal device 200. Such a news gathering method is suitable for performing further news gathering as to the incident reported by the video journalist during the day, and broadcasting the incident in greater detail in an evening or nighttime news program, for example. However, the contents of the news coverage may include some new findings that have been made by the broadcast journalist, and differ from those made by the video journalist. Note that the broadcast journalist can also continue to perform imaging at the scene of the incident.

[2-3. Second Mode of News Gathering in MOJO]

FIG. 13 shows a second mode of news gathering in MOJO, in which broadcasting is performed on the basis of news gathered by a citizen journalist using the terminal device 200, and by a broadcast journalist using the imaging device 100 as imaging equipment for professional use.

In this second mode of news gathering, there is an external server 4000 for providing services on the Internet, which is different from the server 3000 and the like that are used by the broadcasting station 2000. The services on the Internet include various kinds of social network services (SNSs), video distribution sites, blog sites, and Internet TV.

The citizen journalist is a general citizen who has no employment relationship with the broadcasting station 2000. Accordingly, in the second mode of news gathering, the broadcasting station 2000 and the citizen journalist learn of the occurrence of an incident independently of each other. Therefore, the citizen journalist conducts news gathering voluntarily even if there is no news gathering request from the broadcasting station 2000. The citizen journalist can perform imaging and editing as news gathering activities as soon as he/she discovers an incident by chance or encounters an incident.

The citizen journalist who has encountered an incident performs imaging and the like as news gathering activities, using the terminal device 200. Note that, in general, the terminal device 200 is superior in mobility, portability, and communication functions to the imaging equipment for professional use, and accordingly, the citizen journalist is supposed to be able to post and provide the contents of news coverage quicker than the broadcast journalist. Note that that are cases where the citizen journalist attaches text to a captured video image. Also, there are cases where editing of video images captured by the citizen journalist is performed by in the broadcasting station 2000 or in a server of the broadcasting station 2000.

When completing the imaging and editing, the citizen journalist using the terminal device 200 posts the contents of news coverage on an SNS, a video distribution site, and the like on the Internet. This is the first report without going through the broadcasting station 2000. This enables more immediate news reporting than the conventional news reporting that is performed by the broadcasting station 2000.

The broadcasting station 2000 regularly searches SNSs, video distribution sites, blog sites, and the like. Once finding out that the citizen journalist has made a post about an incident on the Internet, the broadcasting station 2000 requests the citizen journalist to provide information, and acquires the contents of the post.

The broadcasting station 2000 that has acquired the contents of the post performs news reporting, using the contents of the post. This enables more immediate news reporting than the news gathering and reporting by the video journalist and the broadcast journalist.

The broadcasting station 2000 may also request the citizen journalist to supply the contents of news coverage such as video data in real time. This makes it possible to perform real-time news reporting (live broadcasting) using video images captured by the citizen journalist.

Further, when completing the imaging and editing, the broadcast journalist using the imaging equipment for professional use transmits video data to the broadcasting station 2000 via the server 3000. The broadcasting station 2000 that has received the video data performs further news reporting following the first report, using video images captured with a camera. Being more sophisticated than the terminal device 200, the imaging equipment for professional use can perform more specific news reporting with higher image quality than video images captured by the terminal device 200. Also, the broadcasting station 2000 can perform real-time reporting (live broadcasting) using video images being transmitted from the broadcast journalist.

The above are examples of news gathering modes in MOJO. Note that each of the modes of news gathering in FIGS. 12 and 13 is merely an example.

By such a news reporting method, news reporting may be performed through live broadcasting or real-time video streaming. In such live broadcasting and real-time video streaming, a journalist might wish to check what the broadcasting station 2000 is currently broadcasting, and how the video images he/she captured are being broadcast. The present technology is useful in such cases.

Specifically, the journalists 1000 (a citizen journalist, a video journalist, and a broadcast journalist) each own an imaging device 100 and a terminal device 200, and perform imaging and editing with the imaging device 100 at the scene of an incident. The imaging data is then transmitted to the broadcasting station 2000 via the server 3000. While conducting broadcasting using the imaging data, the broadcasting station 2000 transmits the contents of the broadcast as return video data to the terminal devices 200 of the journalists 1000. By displaying the return video data on the terminal devices 200, the journalists 1000 can check the contents of the broadcast on the terminal device 200, while performing imaging with the imaging devices 100. It is also possible to give instructions, carry out consultations, have meetings, and the like between the broadcasting station 2000 and the journalists 1000 by voice calls.

<3. Modifications>

Although an embodiment of the present technology has been specifically described so far, the present technology is not limited to the above embodiment, and various modifications based on the technical idea of the present technology may be made to the embodiment.

In the description of the embodiment, video data has been explained as a specific example. However, the present technology can be applied to all kinds of data such as image data, audio data, text data, statistical data, measurement data, programs, and application data.

In the description of the embodiment, the information processing device 300 transmits return video data to the terminal device 200, and further transmits a tally signal. However, the information processing device 300 may transmit only a tally signal.

In the embodiment, the imaging device 100 transmits the identification information about the imaging device 100 to the terminal device 200, and the terminal device 200 transmits the identification information about the terminal device 200 and the identification information about the imaging device 100 to the information processing device 300. However, the terminal device 200 may transmit its own identification information to the imaging device 100, and the imaging device 100 may transmit the identification information about the imaging device 100 and the identification information about the terminal device 200 to the information processing device 300.

As described above as to a case where there is a plurality of terminal devices 200 in the embodiment, there may be a plurality of imaging devices 100.

In the description of the embodiment, the control unit 301 of the information processing device 300 performs a transmission process of transmitting return video data to the terminal device 200 via the communication unit 302. However, the control unit 301 may further perform a different transmission process, depending on the communication environment of the terminal device 200. Here, the communication environment of the terminal device 200 means a communication method (5G, 4G/LTE, 3G, or the like) that can be used for communication between the terminal device 200 and a base station at a place where the terminal device 200 is located, for example.

The control unit 301 of the information processing device 300 according to a modification determines whether the communication environment between the terminal device 200 and the base station is a low-speed communication method (4G/LTE, 3G, or the like), or is a high-speed and high-capacity communication method (5G, for example) capable of communication with a higher capacity at a higher speed than a low-speed and low-capacity communication method, on the basis of information indicating the communication environment. Here, the information indicating the communication environment is information indicating the communication method established between the terminal device 200 and the base station, for example, and may be transmitted from the terminal device 200 to the information processing device 300 via the base station. In this case, other information transmitted from the terminal device 200 to the information processing device 300 may include this information indicating the communication environment. Also, the information indicating the communication environment is positional information indicating the position of the terminal device 200, and the information processing device 300 may acquire the positional information about the terminal device 200. In this case, the control unit 301 of the information processing device 300 refers to a communication area map stored in advance, to determine the communication environment at the position of the terminal device 200 indicated by the acquired positional information.

In a case where the determined communication environment is a low-speed and low-capacity communication method (4G/LTE, 3G, or the like), the control unit 301 of the information processing device 300 controls the communication unit so as to transmit at least a return video image to the terminal device 200. Thus, in an environment where a low-speed and low-capacity communication method can be used, it is possible to reduce the amount of information and perform stable communication by transmitting the minimum necessary video image.

On the other hand, in a case where the determined communication environment is a high-speed and high-capacity communication method (5G, for example), the control unit 301 of the information processing device 300 uses a network slicing technology for virtualizing a network, dividing (slicing) the network resources, and using different slices depending on the purpose of use and the priority level of the communicating signal. Using the network slicing technology, the control unit 301 controls the communication unit so as to transmit a plurality of other signals (including a video image captured by the imaging device 100 paired with the terminal device 200 at the transmission destination, video signals of the other imaging devices 100, and a tally signal) in addition to a return video image.

Here, the control unit 301 of the information processing device 300 controls the communication unit so as to generate information for specifying the slice to which the signal to be transmitted is to be assigned in accordance with the purpose of use and the characteristics of the signal to be transmitted, associate the signal with the information (metadata) for specifying the slice to which the signal is to be assigned, and transmit the signal and the information to the base station. The base station assigns each received signal to the slice specified by each corresponding piece of metadata, and transmits each signal to the terminal device 200, using the slice to which the signal is assigned.

For example, since a return video image is a signal of the highest priority level and needs to be transmitted with low delay, the control unit 301 generates information (metadata) for specifying a slice that can ensure low-delay transmission for the return video image, associates the information with the return video image, sets the other signals as signals of lower priority levels than the return video image, generates information (metadata) for specifying different slices from the above slice, and associates the information with each signal. Here, each signal type may be assigned to a different slice, or some signal types may be assigned to a common slice. In this manner, slices can be assigned and transmitted in accordance with the characteristics required for the respective signals. Thus, the user can check a video image captured by the paired imaging device 100 or some other imaging device 100, while checking a high-priority return video image in a low-delay state.

Note that, in the example described herein, the control unit 301 of the information processing device 300 generates the information for specifying the slice to which the signal to be transmitted is to be assigned. However, the control unit 301 of the information processing device 300 may simply associate information indicating the type of the signal to be transmitted (a return video image, some other signal, or the like) with the signal. In this case, the base station refers to the relationship between the types of signals stored in advance and the slices to which signals of the types are to be assigned, for example, on the basis of information indicating the type associated with each received signal. By doing so, the base station assigns each received signal to each corresponding slice specified on the basis of each type, and can transmit each signal to the terminal device 200, using the slice to which the signal is assigned.

Further, with the video processing device 400, the information processing device 300 according to another modification may perform different video processing on a video signal to be transmitted to the terminal device 200, depending on the communication environment of the terminal device 200.

Furthermore, the information processing device 300 according to another modification may include a video processing unit (not shown) that performs different video processing on the video signal to be transmitted to the terminal device 200, depending on the communication environment of the terminal device 200.

The video processing unit of the information processing device 300 according to another modification performs a resolution conversion process on a video image, depending on the communication environment of the terminal device 200.

In a case where the communication environment determined by the control unit 301 is a low-speed and low-capacity communication method (4G/LTE, 3G, or the like), the video processing unit of the information processing device 300 performs a resolution conversion process to lower the resolution of a return video image (the resolution of a video image captured by the imaging device 100, which is a high resolution such as 4K or 8K, for example), and thus, performs resolution conversion to convert the return video image into a video image with a low resolution (a low resolution such as HD, for example). The control unit 301 controls the communication unit so as to transmit the video signal subjected to the resolution conversion by the video processing unit, to the base station. As a result, the user can check the return video image without causing a reception delay or the like, though the resolution is low. Note that, even in a case where the communication environment is determined to be a low-speed and low-capacity communication method (4G/LTE, 3G, or the like), when a video image captured by the imaging device 100 paired with the terminal device 200 at the transmission destination, and video images captured by the other imaging devices 100 are transmitted in addition to the return video image, the video processing unit can perform resolution conversion on one of the video images or all of the video images.

Note that the video processing unit does not perform a resolution conversion process to lower (down-convert) the resolution of a video image in a case where the communication environment determined by the control unit 301 is a low-speed and low-capacity communication method (4G/LTE, 3G, or the like), but can perform a resolution conversion process to increase (up-convert) the resolution of a video image in a case where the communication environment determined by the control unit 301 is a high-speed and high-capacity communication method (5G, for example). That is, in a case where the communication environment determined by the control unit 301 is a high-speed and high-capacity communication method (5G, for example), the video processing unit of the information processing device 300 performs a resolution conversion process to increase the resolution of a return video image (the resolution of a video image captured by the imaging device 100, which is a low resolution such HD, for example), and thus, converts the video image into a video image with a high resolution (a high resolution such as 4K or 8K, for example). The control unit 301 controls the communication unit so as to transmit the video signal subjected to the resolution conversion by the video processing unit, to the base station. As a result, the user can check a clearer return video image without causing a reception delay or the like. As the resolution of a return video image is adjusted depending on the communication environment in the above manner, the user can check the return video image in a form that achieves both high image quality in the return video image and stability in transmission/reception.

Further, the video processing unit of the information processing device 300 according to another modification performs a frame rate conversion process on a video image, depending on the communication environment of the terminal device 200.

In a case where the communication environment determined by the control unit 301 is a low-speed and low-capacity communication method (4G/LTE, 3G, or the like), the video processing unit of the information processing device 300 performs a frame rate conversion process to lower the frame rate of a return video image (the frame rate of a video image captured by the imaging device 100, which is a high frame rate such as 120 p, for example), and thus, performs frame rate conversion to convert the return video image into a video image of a low frame rate (a low frame rate such as 30 p, for example). The control unit 301 controls the communication unit so as to transmit the video image subjected to the frame rate conversion by the video processing unit, to the base station. As a result, the user can check the return video image without causing a reception delay or the like, though the frame rate is low. Note that, even in a case where the communication environment is determined to be a low-speed and low-capacity communication method (4G/LTE, 3G, or the like), when a video image captured by the imaging device 100 paired with the terminal device 200 at the transmission destination, and video images captured by the other imaging devices 100 are transmitted in addition to the return video image, the video processing unit can perform frame rate conversion on one of the video images or all of the video images.

Note that the video processing unit does not perform a frame rate conversion process to lower (down-convert) the frame rate of a video image in a case where the communication environment determined by the control unit 301 is a low-speed and low-capacity communication method (4G/LTE, 3G, or the like), but can perform a frame rate conversion process to increase (up-convert) the frame rate of a video image in a case where the communication environment determined by the control unit 301 is a high-speed and high-capacity communication method (5G, for example). That is, in a case where the communication environment determined by the control unit 301 is a high-speed and high-capacity communication method (5G, for example), the video processing unit of the information processing device 300 performs a frame rate conversion process to increase the frame rate of a return (the frame rate of a video image captured by the imaging device 100, which is a low frame rate such as 30 p, for example), and thus, performs frame rate conversion to convert the return video image into a video image of a high frame rate (a high frame rate such as 120 p, for example). The control unit 301 controls the communication unit so as to transmit the video signal subjected to the frame rate conversion by the video processing unit, to the base station. As a result, the user can check the return video image of a high frame rate, without causing a reception delay or the like.

Note that, in the example described above, the video processing unit of the information processing device 300 performs the resolution conversion process and the frame rate conversion process separately, but the resolution conversion process and the frame rate conversion process can be performed in parallel.

The present technology can be applied not only to news reporting such as MOJO, but also to any kind of broadcasting such as live dramas and live variety shows.

The present technology can also be embodied in the configurations as described below.

(1)
An information processing device including
a control unit that determines whether or not a terminal device and an imaging device are associated with each other on the basis of first identification information received from the terminal device and second identification information received from the imaging device, and sets the terminal device as a destination of transmission of a return video image on the basis of a determination result.

(2)
The information processing device according to (1), in which, when the determination result satisfies an association condition that is a condition indicating that the terminal device and the imaging device are associated with each other, the control unit sets the terminal device as the destination of transmission of the return video image.

(3)
The information processing device according to (1) or (2), in which the first identification information includes terminal device identification information for identifying the terminal device and imaging device identification information for identifying the imaging device, and the second identification information includes the imaging device identification information.

(4)
The information processing device according to (3), in which, when the determination result indicates that the imaging device identification information included in the first identification information matches the imaging device identification information included in the second identification information, the control unit sets the terminal device as the destination of transmission of the return video image.

(5)
The information processing device according to any one of (1) to (4), in which, when the determination result satisfies both a return video condition and the association condition, the control unit sets the terminal device as the destination of transmission of the return video image, the return video condition being a condition indicating that return video display function information has been received from the terminal device, the return video display function information indicating that a function to display the return video image is included.

(6)
The information processing device according to (2), in which, when the determination result satisfies the association condition, the control unit further sets the terminal device as a destination of transmission of a tally signal.

(7)
The information processing device according to (6), in which, when the determination result satisfies both a tally signal condition and the association condition, the control unit sets the terminal device as the destination of transmission of the tally signal, the tally signal condition being a condition indicating that tally signal presentation function information has been received from the terminal device, the tally signal presentation function information indicating that a function to present a tally signal is included.

(8)
The information processing device according to any one of (1) to (7), in which the terminal device, the imaging device, and the information processing device communicate in a wireless manner.

(9)
An information processing method including:
determining whether or not a terminal device and an imaging device are associated with each other on the basis of first identification information received from the terminal device and second identification information received from the imaging device; and
transmitting a return video image to the terminal device on the basis of a determination result.

(10)
An information processing program for:
determining whether or not a terminal device and an imaging device are associated with each other, on the basis of first identification information received from the terminal device and second identification information received from the imaging device; and
transmitting a return video image to the terminal device on the basis of a determination result.

(11)
A terminal device that transmits first identification information in which imaging device identification information that is received from an external imaging device and is for identifying the external imaging device, and terminal device identification information for identifying the terminal device are associated with each other,
the terminal device including a control unit that performs control to receive a return video image transmitted by an external information processing device on the basis of a result of determination made as to whether or not the terminal device and the imaging device are associated with each other on the basis of the first identification information and second identification information received from the external imaging device.

(12)
The terminal device according to (11), in which the control unit performs control to receive the return video image transmitted by the external information processing device on the basis of a result of determination made as to whether or not an association condition is satisfied, the association condition being a condition indicating that the terminal device and the imaging device are associated with each other.

(13)
The terminal device according to (11) or (12), in which the first identification information includes terminal device identification information for identifying the terminal device and imaging device identification information for identifying the imaging device, and the second identification information includes the imaging device identification information.

(14)

The terminal device according to (13), in which the control unit performs control to receive the return video image transmitted by the external information processing device on the basis of a result of determination made as to whether or not the imaging device identification information included in the first identification information matches the imaging device identification information included in the second identification information.

(15)

The terminal device according to any one of (11) to (14), in which the control unit performs control to receive the return video image transmitted by the external information processing device on the basis of a result of determination made as to whether or not both a return video condition and the association condition are satisfied, the return video condition being a condition indicating that return video display function information has been received from the terminal device, the return video display function information indicating that a function to display the return video image is included.

(16)

The terminal device according to (12), in which the control unit further performs control to receive a tally signal transmitted by the external information processing device on the basis of a result of determination as to whether or not the association condition is satisfied.

(17)

The terminal device according to (16), in which the control unit performs control to receive the tally signal transmitted by the external information processing device on the basis of a result of determination made as to whether or not both a tally signal condition and the association condition are satisfied, the tally signal condition being a condition indicating that tally signal presentation function information has been received from the terminal device, the tally signal presentation function information indicating that a function to present a tally signal is included.

(18)

The terminal device according to any one of (11) to (17), in which the imaging device, the information processing device, and the terminal device communicate in a wireless manner.

(19)

A terminal device control method including:

transmitting first identification information in which imaging device identification information that is received from an external imaging device and is for identifying the external imaging device, and terminal device identification information for identifying the terminal device are associated with each other; and performing control to receive a return video image transmitted by an external information processing device on the basis of a result of determination made as to whether or not the terminal device and the imaging device are associated with each other on the basis of the first identification information and second identification information received from the external imaging device.

(20)

A control program for causing a computer to implement a terminal device control method that includes:

transmitting first identification information in which imaging device identification information that is received from an external imaging device and is for identifying the external imaging device, and terminal device identification information for identifying the terminal device are associated with each other; and performing control to receive a return video image transmitted by an external information processing device on the basis of a result of determination made as to whether or not the terminal device and the imaging device are associated with each other on the basis of the first identification information and second identification information received from the external imaging device.

REFERENCE SIGNS LIST

10 Information processing system
100 Imaging device
200 Terminal device
300 Information processing device
303 Information receiving unit
304 Data receiving unit
305 Data transmitting unit

The invention claimed is:

1. An information processing device, comprising:
control circuitry configured to
determine a determination result indicating whether or not a terminal device and an imaging device are associated with each other based on first identification information received from the terminal device and second identification information received from the imaging device,
in response to determining that the terminal device and the imaging device satisfy an association condition and are associated with each other, set the terminal device as a destination of transmission of a return video image; and
only when determining that the terminal device and the imaging device satisfy the association condition and are associated with each other, set the terminal device as a destination of transmission of a tally signal.

2. The information processing device according to claim 1, wherein the control circuitry is further configured to determine the determination result based on the first identification information, which includes terminal device identification information identifying the terminal device and imaging device identification information identifying the imaging device, and the second identification information, which includes the imaging device identification information.

3. The information processing device according to claim 2, wherein, when the determination result indicates that the imaging device identification information included in the first identification information matches the imaging device identification information included in the second identification information, the control circuitry is further configured to set the terminal device as the destination of transmission of the return video image.

4. The information processing device according to claim 1, wherein, when the determination result satisfies both a return video condition and the association condition, the control circuitry is further configured to set the terminal device as the destination of transmission of the return video image, the return video condition being a condition indicating that return video display function information has been received from the terminal device, the return video display function information indicating that a function to display the return video image is included.

5. The information processing device according to claim 1, wherein, when the determination result satisfies both a tally signal condition and the association condition, the control circuitry is further configured to set the terminal device as the destination of transmission of the tally signal, the tally signal condition being a condition indicating that tally signal presentation function information has been received from the terminal device, the tally signal presentation function information indicating that a function to present the tally signal is included.

6. The information processing device according to claim 1, wherein the terminal device, the imaging device, and the information processing device communicate in a wireless manner.

7. A non-transitory computer-readable medium storing an information processing program that, when executed by processing circuitry, causes the processing circuitry to perform a method, comprising:

determining a determination result indicating whether or not a terminal device and an imaging device are associated with each other based on first identification information received from the terminal device and second identification information received from the imaging device;

in response to determining that the terminal device and the imaging device satisfy an association condition and are associated with each other, transmitting a return video image to the terminal device; and only when determining that the terminal device and the imaging device satisfy the association condition and are associated with each other, transmitting a tally signal to the terminal device.

8. A terminal device that transmits first identification information in which imaging device identification information that is received from an external imaging device and identifies the external imaging device, and terminal device identification information identifying the terminal device are associated with each other, the terminal device comprising control circuitry configured to determine a determination result indicating whether or not the terminal device and the imaging device are associated with each other based on the first identification information and second identification information received from the external imaging device;

in response to determining that the terminal device and the imaging device satisfy an association condition and are associated with each other, perform control to receive a return video image transmitted by an external information processing device; and only when determining that the terminal device and the imaging device satisfy the association condition and are associated with each other, perform control to receive a tally signal transmitted by the external information processing device.

9. The terminal device according to claim 8, wherein the control circuitry is configured to determine the determination result based on the first identification information, which includes terminal device identification information identifying the terminal device and imaging device identification information identifying the imaging device, and the second identification information, which includes the imaging device identification information.

10. The terminal device according to claim 9, wherein the control circuitry is further configured to perform control to receive the return video image transmitted by the external information processing device based on whether or not the imaging device identification information included in the first identification information matches the imaging device identification information included in the second identification information.

11. The terminal device according to claim 8, wherein the control circuitry is further configured to perform control to receive the return video image transmitted by the external information processing device based on whether or not both a return video condition and the association condition are satisfied, the return video condition being a condition indicating that return video display function information has been received from the terminal device, the return video display function information indicating that a function to display the return video image is included.

12. The terminal device according to claim 8, wherein the control circuitry is further configured to perform control to receive the tally signal transmitted by the external information processing device based on whether or not both a tally signal condition and the association condition are satisfied, the tally signal condition being a condition indicating that tally signal presentation function information has been received from the terminal device, the tally signal presentation function information indicating that a function to present the tally signal is included.

13. The terminal device according to claim 8, wherein the imaging device, the information processing device, and the terminal device communicate in a wireless manner.

14. A non-transitory computer-readable medium storing a control program that, when executed by a computer of a terminal device, causes the computer to implement a terminal device control method, comprising:

determining whether or not the terminal device and an external imaging device are associated with each other based on first identification information in which imaging device identification information that is received from the external imaging device and identifies the external imaging device, and terminal device identification information identifying the terminal device are associated with each other, and second information received from the external imaging device;

in response to determining that the terminal device and the imaging device satisfy an association condition and are associated with each other, performing control to receive a return video image transmitted by an external information processing device; and only when determining that the terminal device and the imaging device satisfy the association condition and are associated with each other, performing control to receive a tally signal transmitted by the external information processing device.

* * * * *